US009126684B2

(12) United States Patent
Warner et al.

(10) Patent No.: US 9,126,684 B2
(45) Date of Patent: Sep. 8, 2015

(54) HABITATION AND SLEEPING MODULE FOR ACCOMMODATING AT LEAST ONE MEMBER OF A FLIGHT CREW

(75) Inventors: Holger Warner, Jork (DE); Felix Helfrich, Hamburg (DE)

(73) Assignee: Airbus Operations GmbH (DE)

( * ) Notice: Subject to any disclaimer, the term of this patent is extended or adjusted under 35 U.S.C. 154(b) by 1484 days.

(21) Appl. No.: 12/150,104

(22) Filed: Apr. 24, 2008

(65) Prior Publication Data

US 2008/0302911 A1 Dec. 11, 2008

Related U.S. Application Data

(60) Provisional application No. 60/925,987, filed on Apr. 24, 2007.

(30) Foreign Application Priority Data

Apr. 24, 2007 (DE) .......................... 10 2007 019 341

(51) Int. Cl.
B64D 11/00 (2006.01)

(52) U.S. Cl.
CPC ........ B64D 11/00 (2013.01); *B64D 2011/0076* (2013.01); *Y02T 50/46* (2013.01)

(58) Field of Classification Search
CPC ........ B64D 11/00; B64D 11/04; B64D 11/06; B64D 11/02; B64D 2011/0046; Y02T 50/46
USPC ..................... 244/118.5, 118.6, 122 R, 171.9
See application file for complete search history.

(56) References Cited

U.S. PATENT DOCUMENTS

| 6,305,645 | B1 * | 10/2001 | Moore ........................ 244/118.5 |
| 6,520,451 | B1 * | 2/2003 | Moore ........................ 244/118.5 |
| 7,156,344 | B1 * | 1/2007 | Guering ..................... 244/118.5 |
| 7,389,959 | B2 * | 6/2008 | Mills ........................... 244/118.5 |
| 7,578,533 | B2 * | 8/2009 | Schalla et al. ............... 296/24.3 |
| 7,762,496 | B2 * | 7/2010 | Seiersen et al. ............. 244/118.5 |
| 7,942,367 | B2 * | 5/2011 | Saint-Jalmes et al. ...... 244/118.5 |
| 2003/0029967 | A1 | 2/2003 | Mills |
| 2006/0000947 | A1 * | 1/2006 | Jacob ......................... 244/118.6 |
| 2006/0065783 | A1 | 3/2006 | Mills |
| 2006/0284013 | A1 | 12/2006 | Guering |
| 2009/0050738 | A1 * | 2/2009 | Breuer et al. ............... 244/118.5 |
| 2010/0019087 | A1 * | 1/2010 | Warner et al. .............. 244/118.6 |
| 2010/0065682 | A1 * | 3/2010 | Sorensen .................... 244/118.5 |
| 2010/0140400 | A1 * | 6/2010 | Helfrich et al. ............ 244/118.6 |

FOREIGN PATENT DOCUMENTS

DE 69923925 T2 3/2005
EP 1010617 6/2000

* cited by examiner

*Primary Examiner* — Valentina Xavier
(74) *Attorney, Agent, or Firm* — Lerner, David, Littenberg, Krumholz & Mentlik, LLP

(57) ABSTRACT

A habitation and sleeping module, in an aircraft, for accommodating at least one member of a flight crew, with the module having a first sleeping area. Furthermore, an ascent region is provided for ascending from a lower level into the module, wherein the ascent region includes an ascent device that is laterally arranged on the module.

12 Claims, 23 Drawing Sheets

HABITATION AND SLEEPING MODULE FOR ACCOMMODATING AT LEAST ONE MEMBER OF A FLIGHT CREW

CROSS-REFERENCE TO RELATED APPLICATIONS

This application claims the benefit of the filing date of U.S. Provisional Patent Application No. 60/925,987 filed Apr. 24, 2007, the disclosure of which is hereby incorporated herein by reference.

BACKGROUND OF THE INVENTION

The present invention relates to flight crew rest compartments in aircraft. In particular, the present invention relates to a habitation and sleeping module for accommodating at least one member of a flight crew, to an aircraft comprising a corresponding module, and to the use of a corresponding module in an aircraft.

Flight crew rest compartments (FCRCs) form part of the mandatory equipment of aircraft on long-duration flights. According to international standards, any flight of a duration of between 8 h and 14 h requires one lying-down facility, while flights exceeding 14 h require two lying-down facilities. This is also derived from the requirement wherein from a certain flight duration onwards a total of two alternating cockpit crews must be present on board. This means that the module may be used for extended durations or continuously over the entire duration of the flight.

In recent years the security requirements in aircraft have become significantly more stringent, which also requires separation of the cockpit region from the passenger region. From the point of view of design it can thus well be desirable for pilots to have direct spatial access to the flight crew rest compartment (FCRC) from the cockpit, without there being a need to enter the passenger region.

Known FCRCs are implemented with two lying-down facilities, arranged side-by-side, in the crown area of the aircraft. Most of the time the cockpit crew has to walk a certain distance to get to the FCRC. The confined rest region in the interior of the compartment is followed by a projecting region in the passenger cabin, e.g. the first-class region, which at least in part may not be at full height.

Printed publication EP 1 010 617 shows accommodation for crew members in the crown area of the aircraft. A rest space for several persons is disclosed, wherein due to the arrangement the installation of a seat or of storage compartments may not be possible in practical application.

SUMMARY OF THE INVENTION

A habitation (i.e. residence) and sleeping module for accommodating at least one member of a flight crew, an aircraft comprising such a module, and the use of such a module in an aircraft according to the independent claims are stated.

A habitation and sleeping module for an aircraft for accommodating at least one member of the flight crew is stated, wherein a first sleeping area and an ascent region for ascending or climbing up from a lower level, e.g. a lower level of the aircraft cabin, to the module are provided. Likewise, the ascent region comprises an ascent device that is arranged laterally on the module. In this arrangement the first sleeping area can comprise one or several lying-down facilities. The term "lying-down facility" refers to any device that may make it possible for a person to assume a lying-down rest- and sleep position. The lying-down facility may be a simple foam material support; however, an anatomically matching form of the elements as well as special constructions may also be possible in order to provide a comfortable extended period of rest in a lying-down position. In this arrangement in particular a design as a bed, couchette, plank bed, folding bed, hingeable bed and any further embodiment of a lying-down facility may be possible. In this arrangement in each exemplary embodiment of the present invention variants of a folding bed may, in particular, provide the option, in the folded-in state, of being used as a table or a sideboard. If only part of the bed is folded out, the remaining part of the bed may also be used as a storage or stowage compartment. Furthermore, in a variant of a folding bed there is the option, when the bed is folded in, of gaining base area and thus freedom of movement. This may result in an increase in module comfort.

The sleeping area of the module according to an exemplary embodiment of the invention further excels in that it may provide lying-down facilities both in longitudinal direction of the aircraft and in transverse direction of the aircraft. Furthermore, smaller or larger deviations from a rectangular orientation in relation to the longitudinal axis may be possible and permissible. Thus an angular arrangement of the lying-down facilities in the case of confined spaces may increase the available lying-down area without unnecessarily enlarging the compartment according to the invention.

Moreover, a lying-down facility extending across the longitudinal axis of the aircraft may be associated with an advantage in that a corresponding design projects less invasively into the aircraft region situated behind it. Thus, visual, functional and space-related difficulties during integration may be avoided. Consequently in the cabin region situated behind it the maximum height of the cabin may be utilised and achieved, which creates additional space, for example for safety- or security devices. Likewise the increased danger of passengers bumping their heads against the ceiling may be counteracted.

The ascend device may, according to an exemplary embodiment, be mounted to a side of the module or form an integral part of the side of the module. In order to safe storage room inside the module, the ascend device is mounted to an outside surface of the module.

Furthermore, according to a further exemplary embodiment, the module comprises an ascent region for climbing up from a lower level to the module, wherein the ascent region comprises an ascent device that is arranged laterally on the module. In this arrangement the ascent device may be any mechanical device that may make it possible to climb up from a lower level into the module. In particular, this ascent device may be a stair arrangement, a ladder, an individual step or a landing that makes it possible to climb up. The ascent device is essentially characterised in that it comprises in particular a vertical design so that owing to this any loss of space resulting from the stair arrangement projecting into the passage region of the lower level is prevented. However, if the requirements of the module and of the lower level should make this necessary, a non-vertical, more or less angled ascent device is also possible as a design in this and in any other exemplary embodiment of the present invention.

The solution that has been applied up to now for affixing the ascent device to the face of the module is improved in the present invention so that the space underneath the module is fully available as a storage space. In this arrangement the above-mentioned lateral positioning of the ascent device refers to the ascent device being affixed so that its face points towards the lateral wall of the aircraft. In other words, when the module is installed in the aircraft, the user steps onto the ascent device in transverse direction of the aircraft.

Furthermore, the term "ascent device" among other things refers to a stair arrangement, a ladder, or an individual step, which is, in particular, affixed laterally to the module so as not to cause any loss of space and to ensure as space-saving a design as possible. The lateral vertical affixation results in additional space underneath the module becoming available as storage space, and thus the space underneath the module can be used in its full width, full height and full depth, e.g. for trolleys, items of baggage, clothing, safety devices such as fire extinguishers, or in some other way. Apart from the ascent device, in this arrangement additional elements or fittings such as a handrail or buttons are affixed in order to make it easier for a crew member to climb up. The module according to the invention is designed and constructed such that a direct connection of the module to the cockpit region is possible. This complies with security requirements according to which the pilot does not have to leave the security unit or security zone comprising the cockpit and the flight crew rest compartment in order to enter the compartment. In one exemplary embodiment the ascent region of the module is thus designed such that it may be possible, by direct access, to get from the cockpit to this ascent region of the module without having to enter the passenger region.

According to a further exemplary embodiment of the present invention, the module further comprises a work area. In this arrangement this work area in this and in any other exemplary embodiment can also fully and comprehensively be used as a rest region. In this work area both a seating facility and a table are provided. The term "seat" may, for example, refer to a folding seat, an aircraft seat, a passenger seat, a business class seat or a comfort cabin attendant seat. Likewise, the seating facility can be designed as a TTL-certifiable seating facility, wherein TTL refers to taxi-takeoff-landing. Furthermore, the table provided is a table from the group comprising a folding table, solid table, backrest fold-down table and swivellable table.

Furthermore, according to a further exemplary embodiment of the present invention, the work area comprises various storage spaces, e.g. wall cupboards or normal cupboards. Likewise, a sideboard for the placement of items is installed.

The work area may be separated from the sleeping area by a difference in height, wherein in this case the difference in height can be overcome by additional steps, thus generally-speaking by an ascent device. In this arrangement the work area is partially separated from the sleeping area by partition walls. Likewise, separation within the sleeping space is possible by means of such partition walls.

The design of the work area of the module may make possible on the one hand its use as a rest space 120, which was not possible in the hitherto-known FCRCs, on the other hand requirements for increased comfort such as a seating facility, standing height and headroom in the sleeping area are taken into account.

Further embodiments are set forth in the dependent claims.

The following explanations describe the present invention with reference to a module for accommodating at least one member of an aircraft crew. However, it should be noted that the descriptions relate both to an aircraft that comprises a corresponding module, and to the use of a corresponding module in an aircraft.

According to an embodiment of the present invention, the module comprises a work area that accommodates a member of the flight crew.

This area is designed such that it may be used both as a work space and as a rest space. The spatial arrangement of the sleeping area and work area provides sufficient space for the rest space. In this arrangement a seating facility, a table and storage compartments are provided which, as mentioned above, can comprise a host of different embodiments. Apart from the compulsory equipment, in aircraft, relating to adequate sleeping facilities for members of the crew, a module with a work area provides considerably more flexibility and design options for crew members in their rest intervals and pauses. In this way the overall comfort of the compartment may be significantly improved.

According to an embodiment of the present invention, the module is designed such that the volume underneath the habitation area is available in its full width, full depth and full height as an area for the placement of items.

This is essentially achieved in that the ascent device has been affixed laterally to the module. The face of the module is thus free of any elements that form part of the ascent region, which results in an unlimited provision of storage space. This storage space can thus be used from the face in its full width, full depth and full height, e.g. for trolleys, items of baggage, clothing, safety devices such as fire extinguishers, or in some other way. This design may also be lighter than other embodiments. Especially in the era of large-capacity aircraft this aspect becomes increasingly important and at the same time underlines the advantage of this solution.

According to a further embodiment of the present invention, the work area may comprise at least one element selected from the group comprising a seating facility and a table; likewise, the work area comprises an entrance region.

As a result of the integration of a seating facility the comfort and the flexibility of the module according to an exemplary embodiment of the invention may additionally be increased. Thus a member of the crew present in the module according to the invention is basically not compelled to be lying down; instead s/he can take up whatever rest position at will. This, too, thus results in an agreeable atmosphere in the module. Moreover, comfort is also improved. Likewise, the integration of a table may represent a considerable increase in comfort, which broadens the spectrum of possible activities that a crew member can engage in whilst in the module.

With the integration of an entrance region the functionality of the module according to the invention may be still further increased. Thus the use of the entrance region as a change room, preferably for crew members, is possible. Furthermore, an entrance region, preferably at floor level of the module, makes possible significantly easier reaching of the individual components of the module, since it is not possible to directly enter said module or climb into it. A correspondingly generous design of an entrance region may render a stay in the module according to the invention more pleasant.

According to a further exemplary embodiment of the present invention, the module further comprises a seating facility from the group comprising a folding seat, aircraft seat, passenger seat, business class seat and a high-comfort cabin attendant seat.

In order to, on the one hand, allow adaptations to special desires as flexibly as possible, while on the other hand being able to provide, for example, maximum comfort, the seating facility may be implemented in various ways. It is thus possible to install a folding seat. In this way the basic functional requirement of providing a seating facility is achieved to the full extent; moreover, further advantages result from the increased available space that a folding seat that is not used and is thus folded in, or a folding seat with folded-in backrest or backrest supports, where provided, can provide. Furthermore, foldable components can assume further functions, e.g. by providing additional places for depositing items or sideboard-type areas.

If, however, increased comfort is required, the seating facility according to an exemplary embodiment of the invention can also be implemented as a regular aircraft seat or passenger seat; the installation of a seat with expanded comfort features, e.g. a business-class seat or a high-comfort cabin attendant seat is also possible. This may provide additional advantages, e.g. expanded options for controlling mechanical and electronic components of the compartment such as airstream, light, information and entertainment electronics e.g. video-/DVD presentation on a corresponding display, temperature or communication. Furthermore, a business-class seat makes it possible to easily integrate an additional area for the placement of items, e.g. a folding table stored in the armrest or elsewhere. Integration of a separate table for the first seating facility in the compartment may thus not be necessary.

According to a further exemplary embodiment of the present invention, a table can be provided from the group comprising a fold-out table, solid table, backrest fold-down table and a swivellable table.

In order to, on the one hand, allow adaptations to special desires as flexibly as possible, while on the other hand being able to also provide, for example, maximum comfort, the table may be implemented in various ways. It is thus possible to install a folding table. In this way the basic functional requirement of providing a table is achieved to the full extent; moreover, further advantages may result from the increased available space that a folding table that is not used and is thus folded-in can provide. Furthermore, foldable components can assume further functions, e.g. by providing additional places for depositing items or sideboard-type areas. However, where increased comfort is required it is also possible to permanently affix a solid table. In order to provide a solution that is as flexible as possible and that is mobile, the table may also be implemented in a swivellable design.

According to a further exemplary embodiment of the present invention, the first sleeping area comprises at least one sleeping facility.

In this way the provision of a sleeping facility or several sleeping facilities in the first sleeping area is ensured, and it may thus be possible to flexibly match the number of sleeping facilities to specific requirements. In this way the range of possible applications of the module is significantly enlarged. For example, to meet international standards, flights of a duration of less than eight hours do not require a sleeping facility; flights of a duration of between eight and 14 hours require one sleeping facility; while flights of a duration of more than 14 hours require two sleeping facilities.

According to a further exemplary embodiment of the present invention, the module comprises a further area that adjoins the sleeping area. Likewise, accordingly, the module comprises a new partition wall. The first sleeping area is at least in part separated from the adjoining area by means of this partition wall.

The above is, in particular, not only designed to provide quieter conditions and more space between the individual sleeping facilities, but also to increase privacy of the person/s resting. The partition walls are installed to full height so that they finish off flush with the fuselage section that adjoins at the top. This may further ensure quieter conditions and additional comfort to the person/s resting in their lying-down area. On the side of the adjoining area the partition walls may be used for further tasks. For example the affixation of shelves, mirrors or work surfaces on these partition walls in the adjoining area is imaginable.

According to a further exemplary embodiment of the present invention, the module is designed such that it essentially connects directly to the cockpit.

With a corresponding design the space requirement may be further reduced. The module, which is essentially used for the cockpit crew, is moved closer to the cockpit. In this way the walking distance, and thus the time to walk the distance, for the cockpit crew can be minimised. Thus separation of the cockpit region from the passenger region, which aspect is becoming increasingly important for security reasons, can be achieved, and direct entry from the cockpit to the module becomes possible for the cockpit crew. Finally, for quite some time there has been a need to design the cockpit region including the FCRC situated behind it as a single security zone that is separate from the passenger region and is not freely accessible. Likewise, by designing the module so that it is directly adjacent to the cockpit there is less visual and spatial interference in the passenger region. Consequently, the cabin design is not influenced and, particularly significantly, more volume is available for potential safety devices in the cabin region.

According to a further exemplary embodiment of the present invention, the sleeping area extends from the work area to the front of the module in longitudinal direction of the module. Furthermore, the sleeping area comprises two sleeping facilities in longitudinal direction of the aircraft.

In this description the term "front of the module" refers to the face that points in the direction of the front of the aircraft, i.e. in the direction of the cockpit. Due to this arrangement there is no negative influence on the cabin design and appearance so that, in particular, business class and first class benefit. Furthermore, as far as the design is concerned, there are practically no creative restrictions relating to this cabin region. At the same time, in this arrangement too, when the ascent devices are placed laterally, it is possible to store additional trolleys. In addition, with this implementation, direct contact to the cockpit provides an option of implementing direct entry from the cockpit to the module. This represents not only increased convenience to the crew because of shorter walking distances, but it also takes into account the security requirement of a front security zone comprising the cockpit and the FCRC.

According to a further exemplary embodiment of the present invention, the first sleeping area extends from the work area to the rear of the module and furthermore comprises a rear sleeping facility and a lateral sleeping facility. In this arrangement the rear sleeping facility extends so as to be perpendicular to the longitudinal direction of the aircraft, whereas the lateral sleeping facility extends so as to be parallel to the longitudinal direction of the aircraft.

This arrangement may provide an agreeable comfort advantage in that above the pillow there is significantly better headroom to the ceiling for the person resting. Due to the different alignment of the two sleeping facilities there is also a separate, spatially divided, entry to the two sleeping facilities, which significantly improves the comfort for the users of the two modules. Likewise, in this exemplary embodiment there is no restriction to the storage space underneath the module, so that there is no loss of a trolley underneath the module. Since the module does not project beyond the adjacent passage on the front of the module, the height within this passage does not have to be taken into account any further. However, if it should become necessary for the module to project into the passage by some millimetres or centimetres, at least across most of the passage width the height of the passage does not have to be taken into account.

According to a further exemplary embodiment of the present invention, apart from a first sleeping facility the module also comprises a second sleeping area with a second sleeping facility. The specific design is such that the first sleeping area extends from the work area to the front of the module, while the second sleeping area extends from the work area to the rear of the module. In this arrangement the design is selected such that the two sleeping facilities are aligned so as to be perpendicular in relation to the longitudinal direction of the aircraft.

Since in this exemplary embodiment both sleeping areas are separated by the work area, this design features, in particular, a high level of privacy because the two beds are separated so as to be spatially far apart from each other. Apart from the comfortable entry, here too there is the option of creating a combination of rest space and sleeping space.

According to a further exemplary embodiment of the present invention, the module comprises an opening in the ascent region, through which opening it may be possible to enter the module from the lower level.

In order to meet not only the security requirements, but also to provide the required privacy in the module, it is possible to affix a door of whatever design in the opening, which applies both to this exemplary embodiment and to any other exemplary embodiment of the present invention. In this arrangement, in particular, a hinged door, a lateral sliding door, or a vertical roller door is imaginable. If the requirements relating to privacy and security allow this, it is also possible to provide a design with a weight-optimising door-less opening, which applies both to this exemplary embodiment and to any other exemplary embodiment of the present invention.

In this way it may be possible to expand the cockpit region by means of the module according to the invention. In particular if a special door module is used, as it is used for cockpit doors themselves, and with the use of constructional measures in the region of the partition walls, a significantly enlarged security region can be provided to the cockpit crew. In this security region the individual members of the crew can then move freely. This embodiment is also advantageous with a view to possible future developments of completely separating the region of the cockpit crew from the passenger region so as to prevent attacks or terrorist activities, or at least make these more difficult. By at the same time enlarging the region that is available to the cockpit crew, it may thus be possible to implement such a requirement while optimising the psychological and physical load aspects.

According to a further exemplary embodiment of the present invention, the module comprises a seating facility that is designed as a TTL-certifiable seating facility.

In this context the term "TTL-certifiable seating facility" refers to its use as a taxi-takeoff and landing seat. Especially by its arrangement in the form of a specially designed seat it is possible to certify the first seating facility as a TTL seating facility. In this way a comparable seating facility for flight crew in the passenger region can be done without, which can result in further freedom of design and in possible savings in weight.

According to a further exemplary embodiment of the invention, an aircraft is stated that comprises a corresponding module.

Furthermore, according to a further exemplary embodiment of the invention, the use of a corresponding module in an aircraft is stated.

Further exemplary embodiments of the invention are stated in the following description of the figures.

The illustrations in the figures are diagrammatic and not to scale.

DETAILED DESCRIPTION

Figure 1:
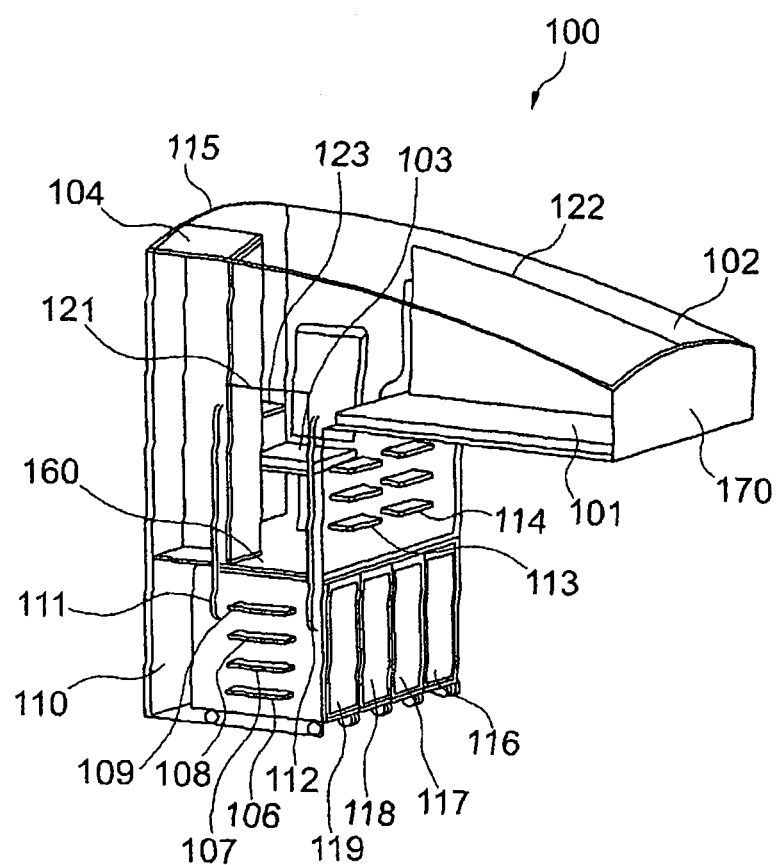
FIG. 1 shows a diagrammatic three-dimensional view of the habitation and sleeping module according to an exemplary embodiment of the invention.

Below, exemplary embodiments of the present invention are described with reference to the figures.

In the following description of the figures, the same reference characters are used for identical or similar elements.

Below, the present invention is described by means of several preferred embodiments of the habitation and sleeping module according to an exemplary embodiment of the invention. However, the explanations provided also apply to an aircraft comprising a corresponding module, and to the use of a corresponding module in an aircraft.

FIG. 1 shows a diagrammatic three-dimensional view of the habitation and sleeping module 100 according to an exemplary embodiment of the invention. By way of an ascent region 110 a crew member can climb up to the module and enter it. This ascent region comprises so-called ascent devices, in the example shown they are four individual steps 106 to 109 and two handrails 111 and 112. In this arrangement the term "handrail" 112 refers to any mechanical device which when affixed to the ascent region 110 makes it easier for a crew member to climb up. The present exemplary embodiment clearly shows the advantage of a vertical arrangement of the ascent devices. From the point of view of making the most of existing space, a vertical arrangement of the ascent devices represents an optimum solution. The present example also shows that the ascent devices are affixed laterally to the module. This provides additional storage space for trolleys 116 to 119, which storage space is situated underneath the work area 160. The ascent region 110 further comprises an opening 121 through which the crew member can reach the habitation and sleeping area 170. In order to take into account not only security requirements but also privacy requirements in the module, a door of whatever design can be affixed in the opening, which applies both to this exemplary embodiment and to any other exemplary embodiment of the present invention. In this arrangement, in particular, a hinged door, a lateral sliding door, or a vertical roller door is possible.

If the requirements relating to privacy and security allow this, it is also possible to provide a design with a weight-optimising door-less opening, which applies both to this exemplary embodiment and to any other exemplary embodiment of the present invention. Furthermore, in the habitation area, which can also be used as a work area, storage space is provided by means of a cupboard 104. The seating facility 103 and the table 123 are affixed in the work area 160. The diagram shows a possible design of the sleeping area 170 at an elevated level above the floor of the work area 160. In this arrangement the sleeping area 170 comprises two sleeping facilities 101 and 102. In order to improve the comfort and to reduce the noise within the sleeping area, these two sleeping facilities are separated by a partition wall 122. Both sleeping facilities can be reached individually by way of respective ascent devices 113 and 114. In this arrangement, in the middle, at the level of the partition wall, a handrail 120 is affixed in order to facilitate climbing up. The arrangement shown in the diagram has no negative influence on the cabin design and appearance so that in particular business class and first class benefit from this. In contrast to existing solutions, as far as the design, too, is concerned, there are practically no creative restrictions relating to this cabin region. In addition, with this implementation, direct contact to the cockpit provides an option of implementing direct entry from the cockpit to the module 100. This represents not only increased convenience for the crew because of shorter walking distances, but also takes into account the security requirement of a front security zone comprising the cockpit and the FCRC.

If required or desired, in this and in any other exemplary embodiments, the rear wall and all the other outside walls of the module can be designed such that they are access-proof, entry-proof, bullet-proof or in some other way conform to the security requirements relating to the cockpit crew.

Figure 2:
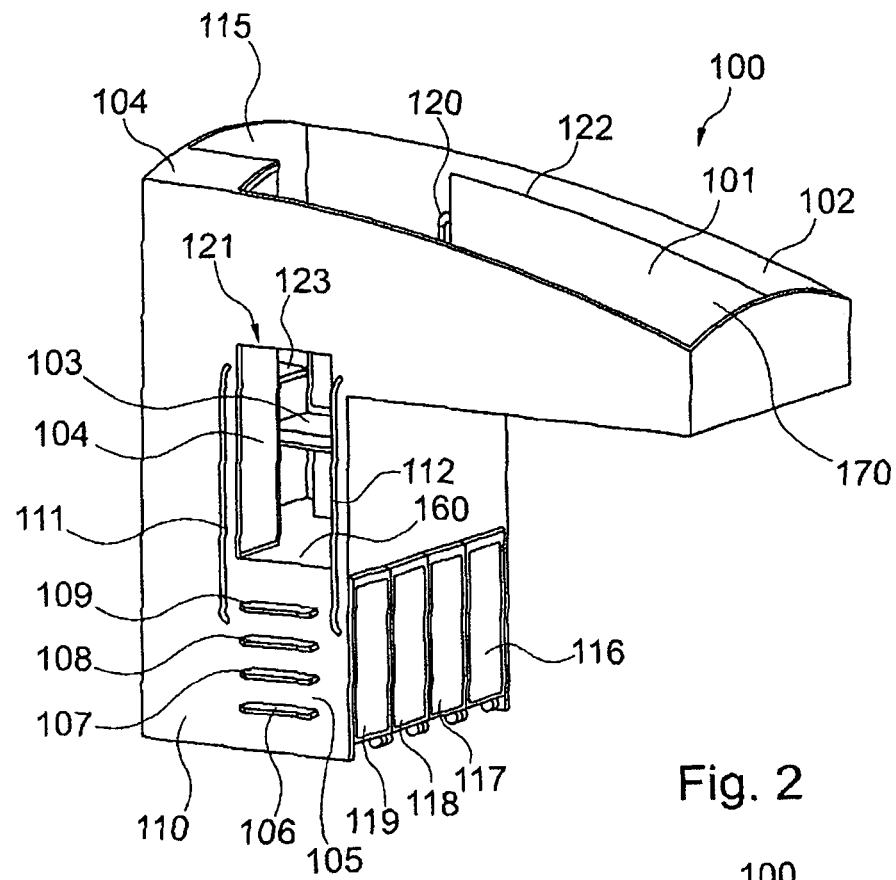
FIG. 2 shows a diagrammatic three-dimensional view of the habitation and sleeping module according to an exemplary embodiment of the invention.

FIG. 2 shows a further diagrammatic three-dimensional view of a habitation and sleeping module.

Figure 3:
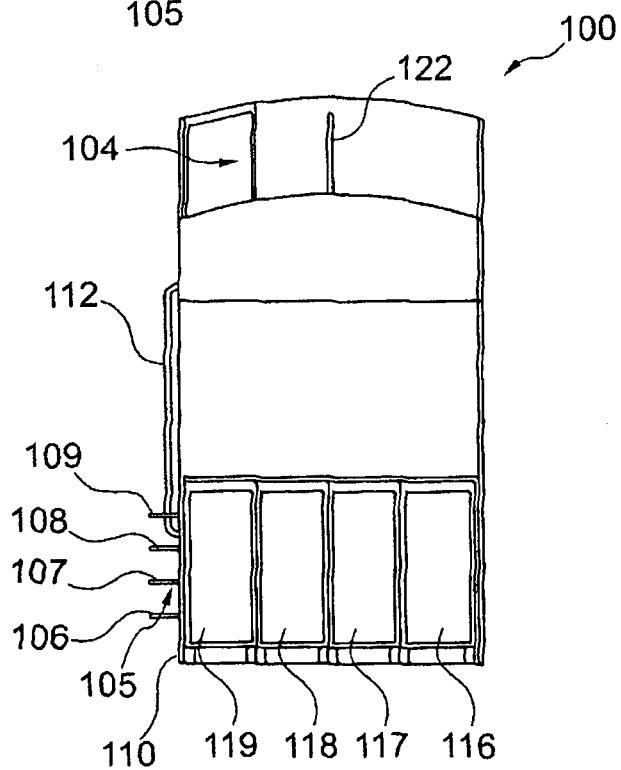
FIG. 3 shows a diagrammatic two-dimensional view according to an exemplary embodiment of the present invention, with a view of the front of the module.

FIG. 3 shows a diagrammatic two-dimensional lateral view of the front of a module 100. The diagram clearly shows that the complete volume underneath the habitation area is available in its full width, full depth and full height as an area for the placement, for example, of trolleys 116 to 119. The diagram shows a lateral view of the ascent region 110. By way of the ascent devices 106 to 109, in the diagram shown they are individual steps, a crew member gains access to the module. This exemplary design of the steps may be replaced by other mechanical constructions that make it possible to enter the elevated work area. Furthermore, handrails 112 have been affixed in the ascent region 110, which handrails 112 also facilitate climbing up. In this arrangement the term "handrail" 112 refers to any mechanical device which when affixed to the ascent region 110 makes it easier for a crew member to climb up. Also shown is the partition wall 122 that separates the two sleeping facilities in the sleeping area.

Figure 4:
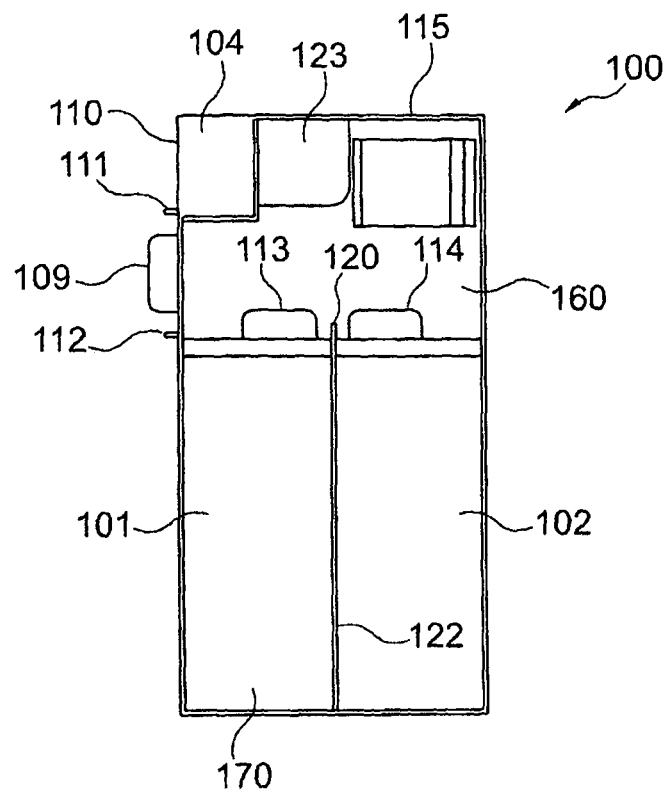
FIG. 4 shows a diagrammatic two-dimensional horizontal section view according to an exemplary embodiment of the present invention, with a top view of the module.

FIG. 4 shows a diagrammatic two-dimensional horizontal section view and provides a top view of a module 100. The diagram shows that the work area 160 is clearly separated from the sleeping area 170. Spacing the two areas far apart increases the level of comfort and improves the potential for resting in the habitation and sleeping module. With respect to the two separate sleeping facilities 101 and 102 the diagram shows the separate ascent options 113 and 114 from the work area to the respective sleeping facility. The ascent region 110 shows that a vertical arrangement of the ascent devices 109, 111 and 112 takes up a minimum of space for the ascent region.

Figure 5:
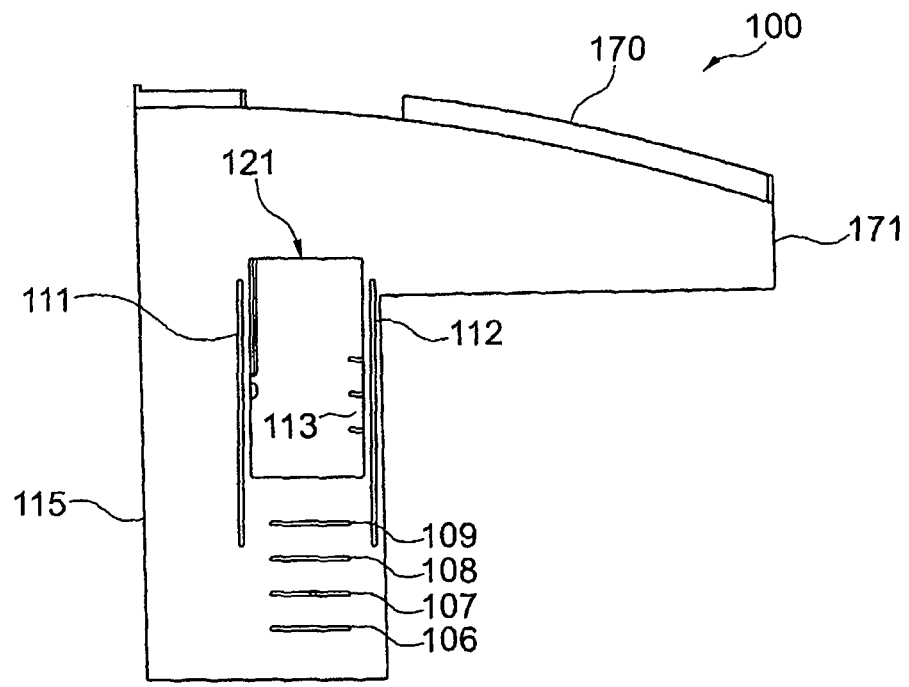
FIG. 5 shows a diagrammatic two-dimensional lateral view according to an exemplary embodiment of the present invention, with a view of the lateral ascent region.
Figure 25:
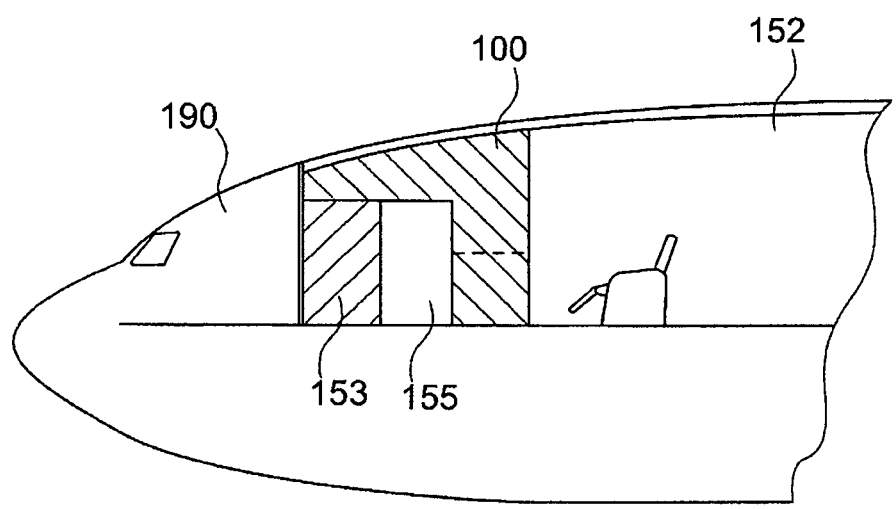
FIG. 25 shows a diagrammatic two-dimensional vertical section view of the aircraft fuselage according to an exemplary embodiment of the present invention.

Although the invention herein has been described FIG. 5 shows a diagrammatic two-dimensional lateral view of a module. The sleeping area 170 slopes towards the front 171. This results from the given fuselage structure of the aircraft, which fuselage structure is also shown in FIG. 25 with an example of this embodiment of the invention. The embodiment of the sleeping area at the front of the module makes it possible to provide a direct connection between the module and the cockpit region.

Figure 6:
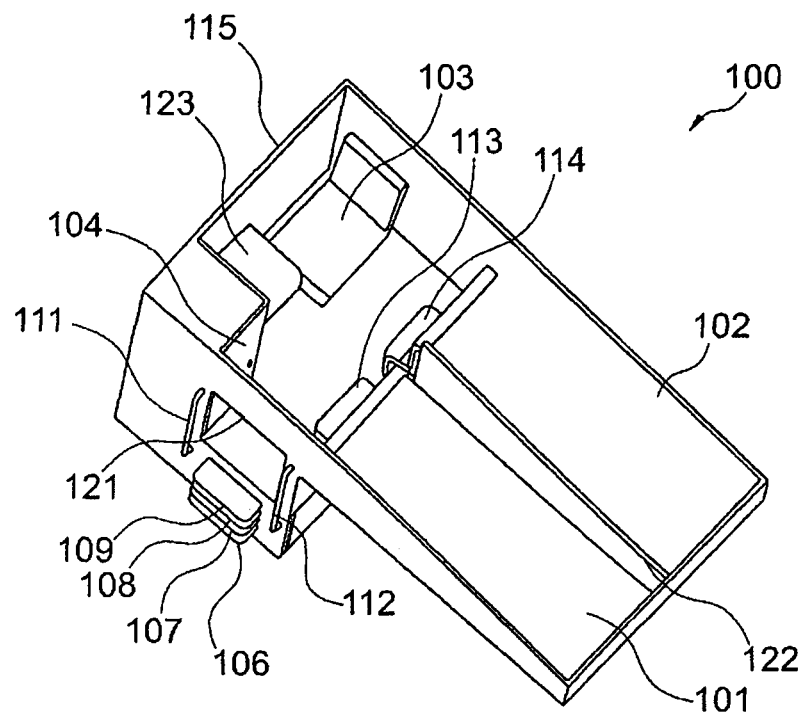
FIG. 6 shows a diagrammatic three-dimensional view of the habitation and sleeping module according to an exemplary embodiment of the invention.
Figure 7:
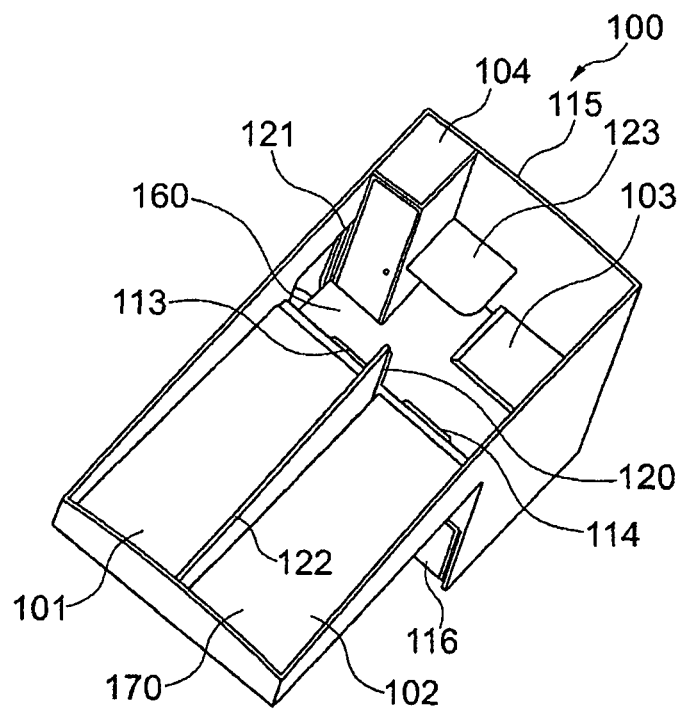
FIG. 7 shows a diagrammatic three-dimensional view of the habitation and sleeping module according to an exemplary embodiment of the invention.

FIGS. 6 and 7 further show diagrammatic three-dimensional top views of a module 100. The figures provide a detailed view of the sleeping area 170 and of the work area 160.

Figure 8:
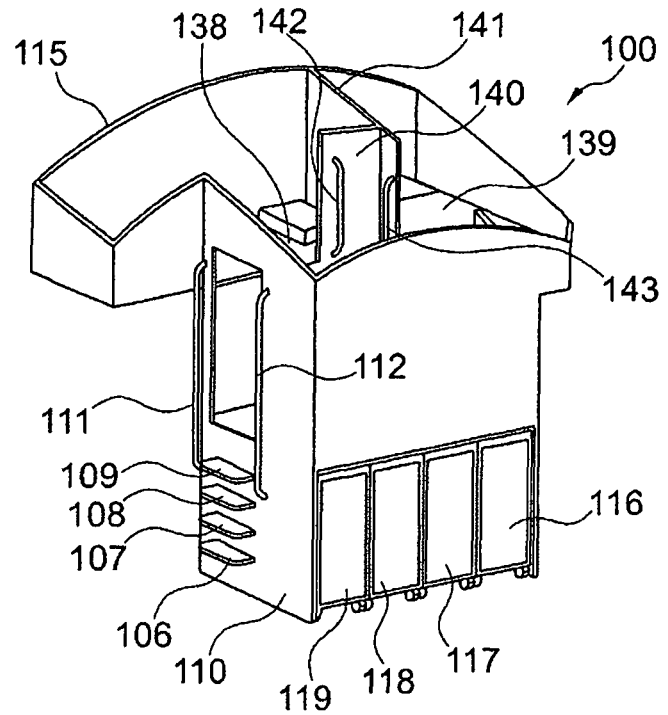
FIG. 8 shows a diagrammatic three-dimensional view of the habitation and sleeping module according to an exemplary embodiment of the invention, comprising a rear and a lateral sleeping facility.
Figure 9:
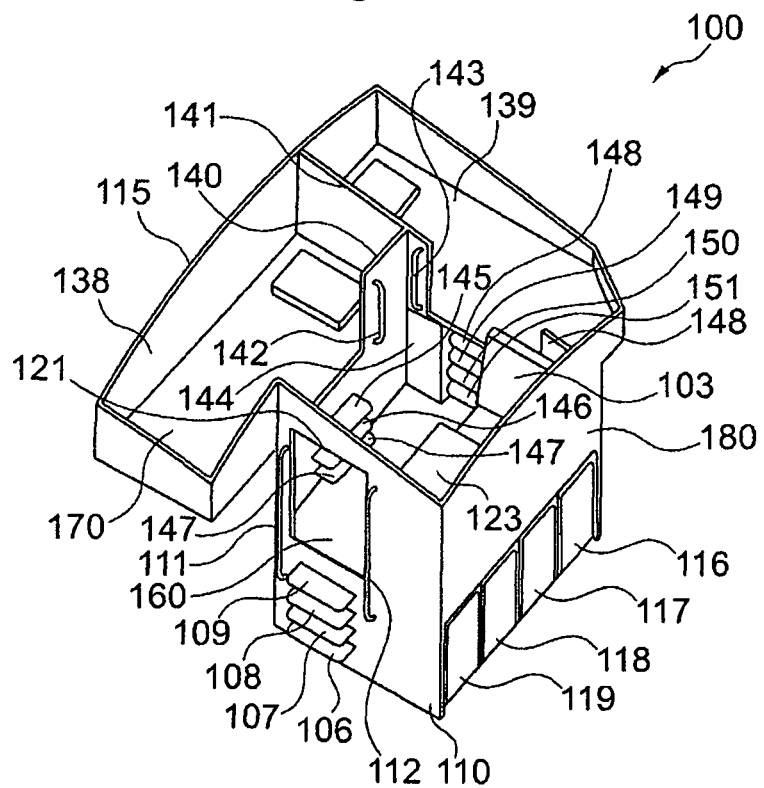
FIG. 9 shows a diagrammatic three-dimensional view of the habitation and sleeping module according to an exemplary embodiment of the invention, comprising a rear and a lateral sleeping facility.

FIGS. 8 and 9 show a diagrammatic three-dimensional view of a habitation and sleeping module 100. In this arrangement the module comprises a sleeping area 170 that extends from the work area 160 towards the rear of the module. Furthermore, the sleeping area comprises a rear sleeping facility 138 and a lateral sleeping facility 139, wherein the rear sleeping facility extends so as to be perpendicular to the longitudinal direction of the aircraft, and the lateral sleeping facility extends so as to be parallel to the longitudinal direction of the aircraft. Both sleeping facilities are separated from the adjacent sleeping area or work area by means of partition walls 140 and 141. Likewise, fittings such as grips or handrails are affixed to these partition walls, which grips or handrails are designated 142 and 143 in the diagram. Likewise, a storage compartment 144 is provided underneath the lateral sleeping facility, which storage compartment 144 in an exemplary manner in the drawing is designed as a cupboard wall. In the work area 160 the seating facility 103 and the table 123 are arranged, likewise, in the work area, ascent devices 145 to 151 are affixed, which ascent devices 145 to 151 are designed to make it possible to climb up from the lower level of the work area to the sleeping area. Furthermore, on the lateral wall the module comprises the ascent region 110, which by means of various ascent devices 106 to 109 and 111 to 112 makes it possible for a person to climb up from a lower level to the module. In this arrangement the steps 106 to 109 are to be regarded as exemplary for any mechanical component that makes it possible for a crew member to climb into the module. By means of a lateral affixation of the ascent region, on the face of the module 180 the space underneath the work area is available as a storage space in its full width, full depth and full height. In the drawing, this space is, for example, used for trolleys 116 to 119. The rear sleeping facility 138 clearly shows that this arrangement provides more headroom, between the pillow and the ceiling, for a crew member. Due to the transverse arrangement of the rear bed, in combination with FIG. 26, which, for example, shows the arrangement of such a module in an aircraft fuselage, it becomes evident that when compared to a longitudinal arrangement of the rear bed, the influence on the cabin design and on the appearance of the cabin may be significantly reduced. This arrangement also makes it considerably more agreeable to climb up to the sleeping area, because both ascent devices are spaced much further apart than is the case, for example, in FIG. 1.

Figure 10:
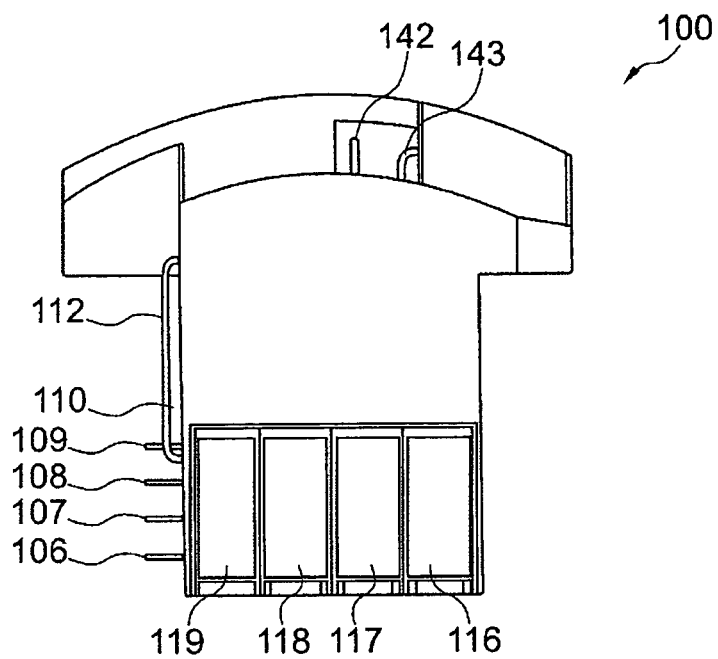
FIG. 10 shows a diagrammatic two-dimensional view according to an exemplary embodiment of the present invention, with a view of the front of the module.

FIG. 10 shows a diagrammatic two-dimensional view of a module 100 according to an exemplary embodiment of the present invention. The lateral arrangement of the ascent region 110 with its ascent devices 106 to 109 and 112 shows that at the front of the module storage space is provided across the full width. In the embodiment shown, this storage space is used as an area for the placement of trolleys 116 to 119.

Figure 11:
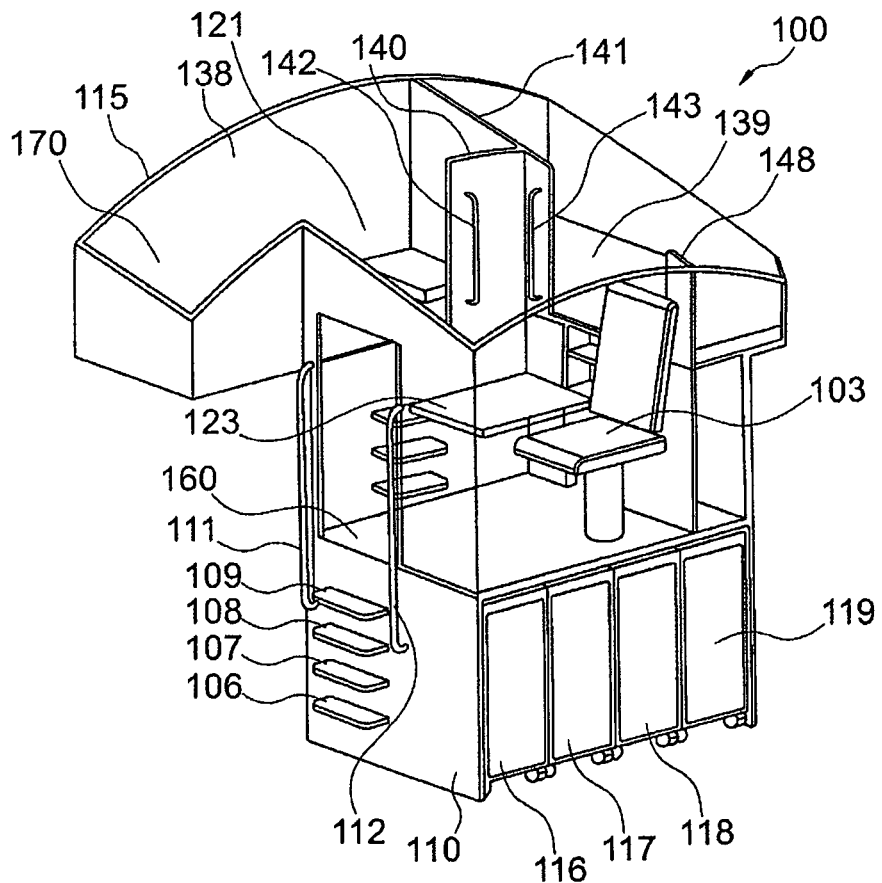
FIG. 11 shows a diagrammatic three-dimensional view of the habitation and sleeping module according to an exemplary embodiment of the invention, comprising a rear and a lateral sleeping facility.

FIG. 11 shows a diagrammatic three-dimensional view of a module 100 according to an exemplary embodiment of the present invention, wherein the figure is shown as a transparent version of FIG. 8. This shows in particular the work area 160 with its table 123 and its seating facility 103.

Figure 12:
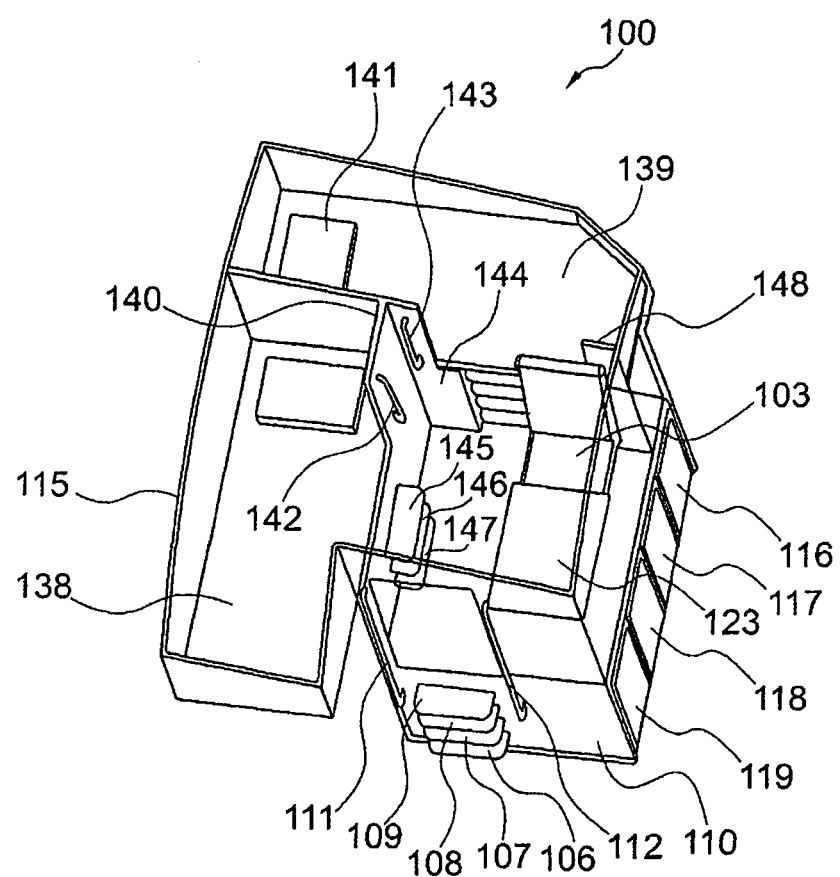
FIG. 12 shows a diagrammatic three-dimensional view of the habitation and sleeping module according to an exemplary embodiment of the invention, comprising a rear and a lateral sleeping facility, with a top view of the module.
Figure 13:
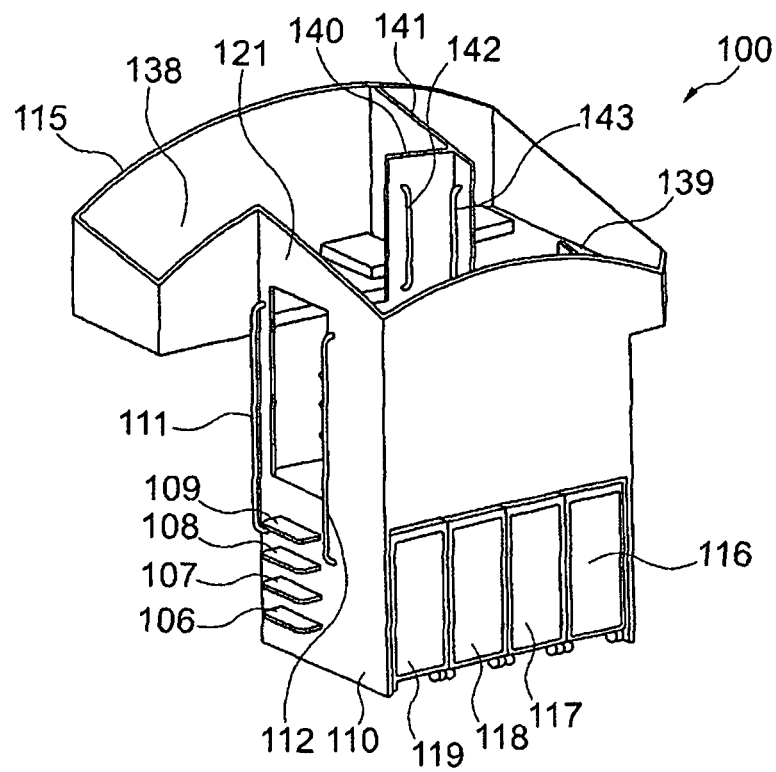
FIG. 13 shows a diagrammatic three-dimensional view of the habitation and sleeping module according to an exemplary embodiment of the invention, comprising a rear and a lateral sleeping facility.
Figure 14:
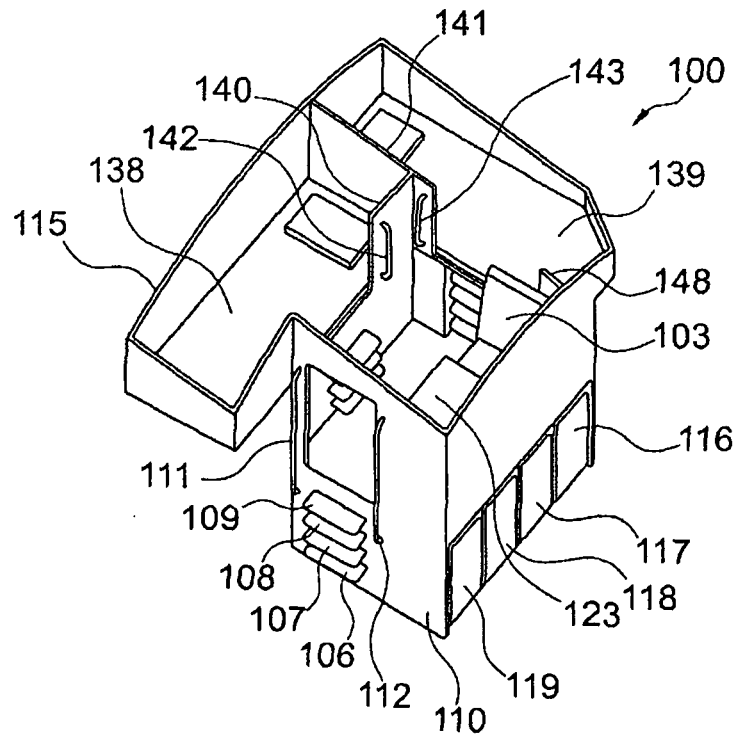
FIG. 14 shows a diagrammatic three-dimensional view of the habitation and sleeping module according to an exemplary embodiment of the invention, comprising a rear and a lateral sleeping facility.

FIGS. 12 to 14 show diagrammatic three-dimensional views of a module 100 according to an exemplary embodiment of the present invention.

Figure 15:
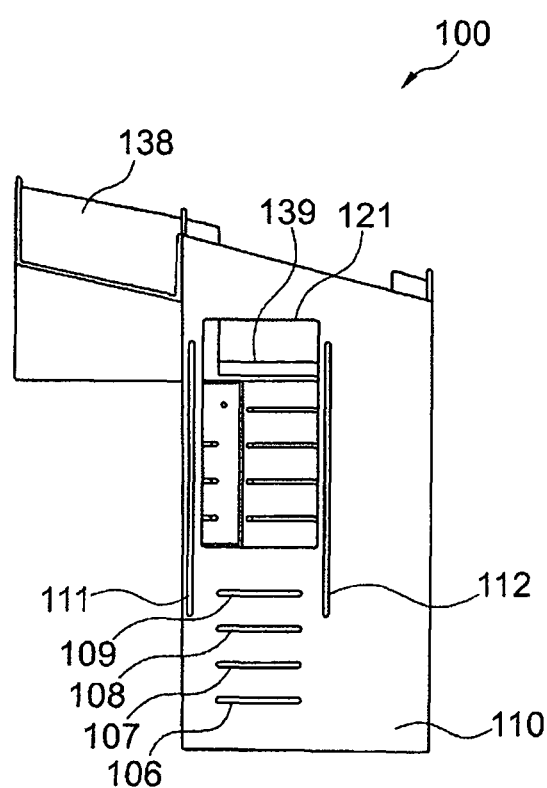
FIG. 15 shows a diagrammatic two-dimensional lateral view according to an exemplary embodiment of the present invention, with a view of the lateral ascent region.

FIG. 15 shows a diagrammatic two-dimensional view of a module 100 according to an exemplary embodiment of the present invention, with a lateral view of the ascent region 110. Beside the rear sleeping facility 138, which is arranged across the longitudinal direction of the aircraft, the second sleeping facility 139 is evident through the opening 121. The second sleeping facility 139 is arranged so as to be parallel to the longitudinal direction of the aircraft. As a result of this, the upper dimensions of the module in longitudinal direction of the aircraft are kept to a minimum. As shown in a supplementary manner in FIG. 26, which shows the exemplary module 100 of FIG. 15, this installation of the module does not require any further consideration relating to the height of the passage in the cross-aisle region 155.

Figure 16:
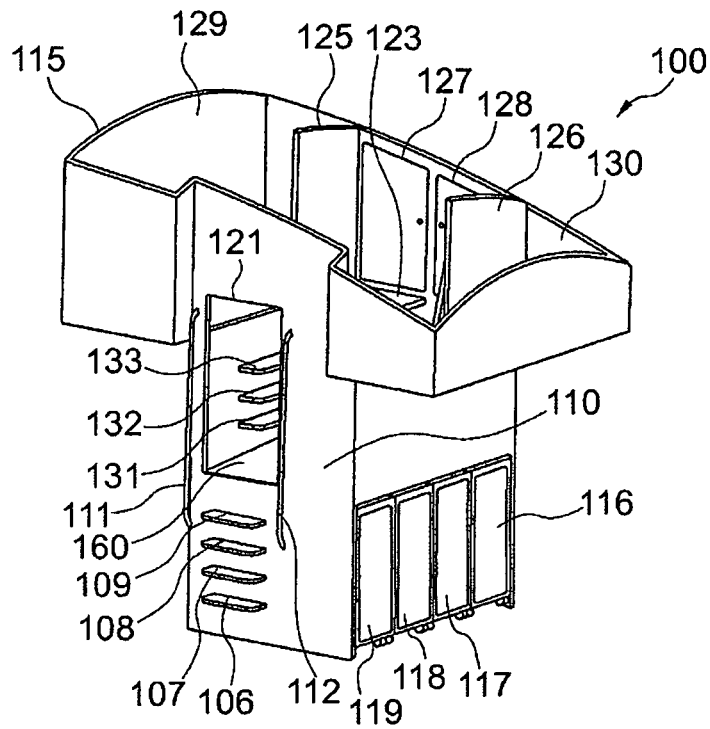
FIG. 16 shows a diagrammatic three-dimensional view of the habitation and sleeping module according to an exemplary embodiment of the invention, comprising a sleeping facility in front of and behind the work area.

FIG. 16 shows a further diagrammatic three-dimensional view of a module according to the invention. In this exemplary embodiment the first sleeping area with the first sleeping facility 130 is arranged from the work area 160 towards the front of the module. In this arrangement the second sleeping area with the second sleeping facility 129 is arranged from the work area 160 to the rear of the module. Both sleeping facilities 129 and 130 extend so as to be perpendicular to the longitudinal direction of the aircraft. This arrangement of the sleeping areas in relation to the work area provides a particularly high level of privacy because the two beds are separated so as to be spaced far apart from each other. The diagram also shows that the rear sleeping facility 129 provides the crew member with very good headroom between the pillow and the ceiling. In order to further improve the level of privacy, the two sleeping areas are divided from the actual work area 160 by means of partition walls 125 and 126. The work area further comprises storage space, for example cupboard compartments 127 and 128, with a table 123 also being provided in this work area 160. This exemplary embodiment shows the two sleeping facilities 129 and 130 at an elevated level relative to the work area 160, which is regarded as an exemplary rather than as a compulsory solution. In order to get from the work area to the two sleeping areas, steps 131, 132 and 133 are shown as exemplary ascent devices to climb up from the work area to the sleeping area. Likewise, on the lateral wall of the module the ascent region 110 is shown, from which the crew member can climb up from a lower level to the module 100. In this arrangement ascent devices, in the present embodiment for example individual step boards 106, 107, 108, are affixed to the lateral wall of the module; likewise the two rails 111 and 112 form exemplary ascent devices for it. In this document the term "rail" refers to any mechanical device that when affixed to the ascent region 110 makes it easier for a crew member to climb up. The lower front of the module shows that with the design of the lateral ascent the entire storage space underneath the work area can be used. This is shown in an exemplary manner in FIG. 16 by the accommodation of four trolleys 116 to 119. Likewise, the opening 121 in the ascent region is shown, through which opening the crew member can enter the module. Furthermore, the rear wall 115 represents a wall transition between the module and the passenger region.

Figure 17:
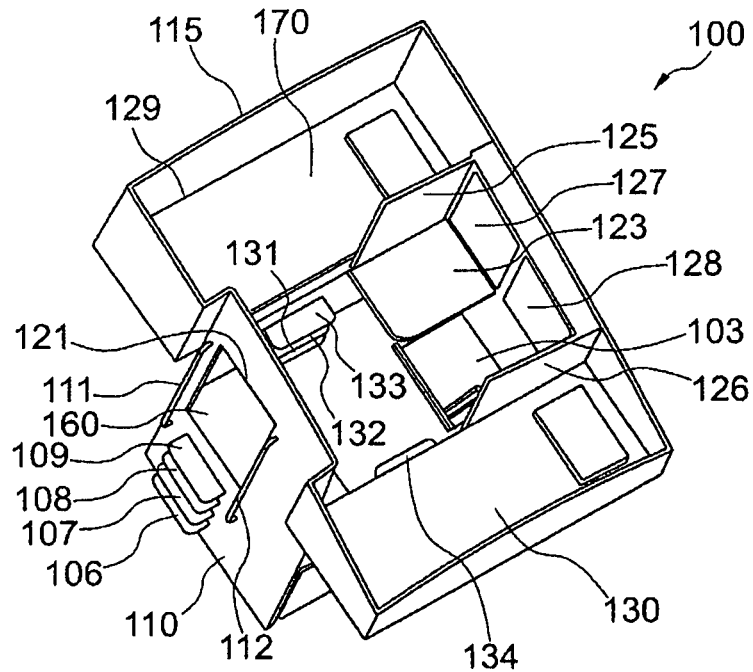
FIG. 17 shows a diagrammatic three-dimensional view of the habitation and sleeping module according to an exemplary embodiment of the invention, comprising a sleeping facility in front of and behind the work area with a top view of the module.

FIG. 17 shows a diagrammatic three-dimensional top view of a module according to an exemplary embodiment of the invention, with an improved view of the work area 160. Apart from the exemplary embodiment of a table 123, the seating facility 103 is also shown, which apart from the available storage compartments 127 and 128 forms part of the significant content of the work area 160. The diagram also shows that ascent devices 134 for climbing up from the work area 160 to the first sleeping facility 130 are affixed. In the diagram, these ascent devices are, for example, step boards, wherein any mechanical construction that facilitates climbing up from the work area to the sleeping area may be possible.

Figure 18:
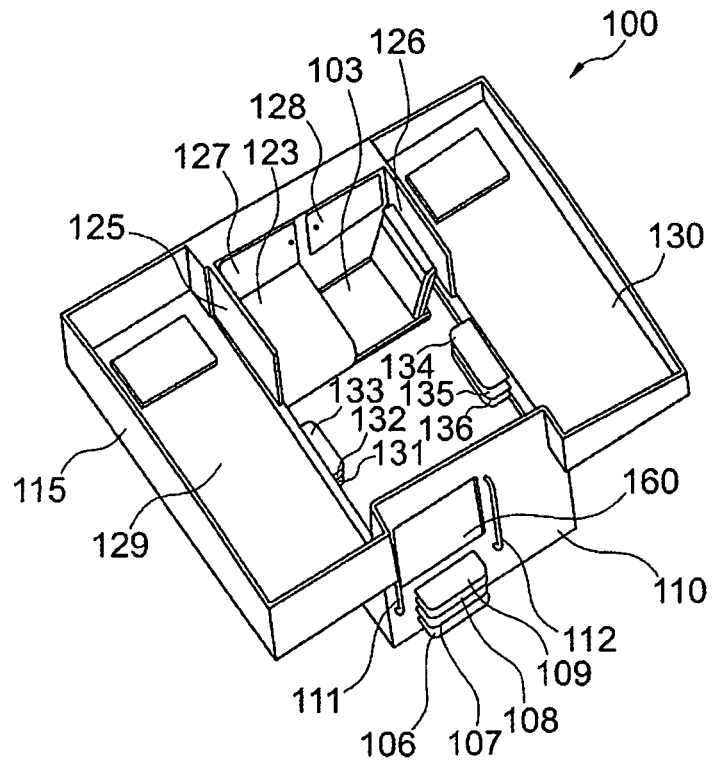
FIG. 18 shows a diagrammatic three-dimensional view of the habitation and sleeping module according to an exemplary embodiment of the invention, comprising a sleeping facility in front of and behind the work area with a top view of the module.

FIG. 18 shows a diagrammatic three-dimensional top view of a module according to the invention, with an improved view of the ascent devices 134, 135 and 136 for climbing up from the work area 160 to the sleeping area comprising the first sleeping facility 130.

Figure 19:
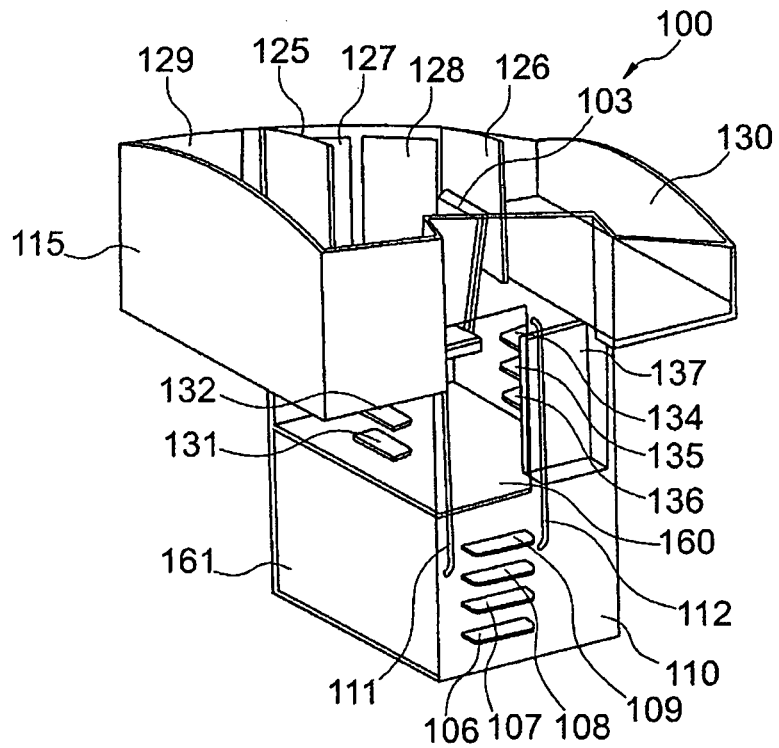
FIG. 19 shows a diagrammatic three-dimensional view of the habitation and sleeping module according to an exemplary embodiment of the invention, comprising a sleeping facility in front of and behind the work area.

FIG. 19 shows a diagrammatic three-dimensional view of a module according to the invention, wherein the transparent diagram shows the wall cupboard 137 in the lateral wall, in which wall the ascent region 110 is also located. This wall cupboard is provided to improve the level of comfort in the work area 160 because in this way more storage space can be created. Both rear walls 115 and 161 of the module are wall transitions between the module and the passenger region. Furthermore, the transparent diagram shows the way the ascent devices 131 and 132 to the second sleeping area with the second sleeping facility 129 have been affixed.

Figure 20:
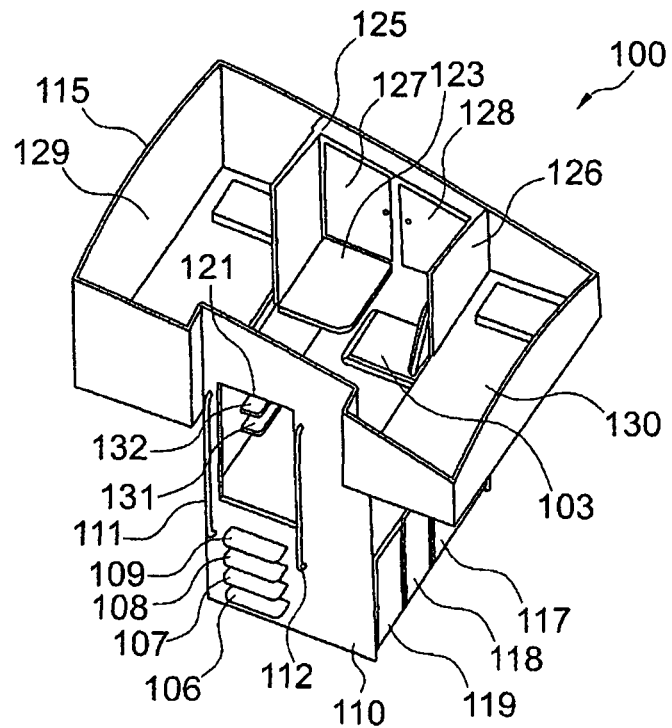
FIG. 20 shows a diagrammatic three-dimensional view of the habitation and sleeping module according to an exemplary embodiment of the invention, comprising a sleeping facility in front of and behind the work area.
Figure 21:
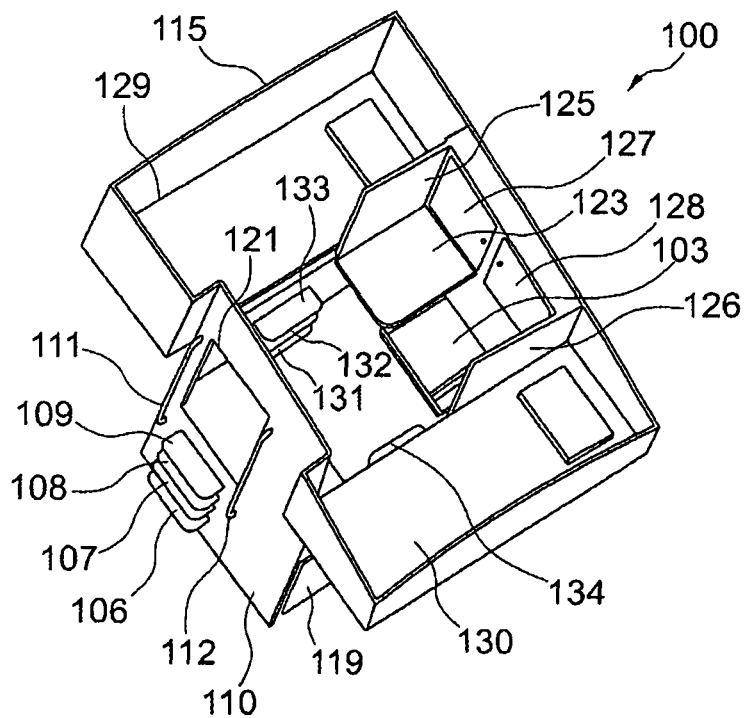
FIG. 21 shows a diagrammatic three-dimensional view of the habitation and sleeping module according to an exemplary embodiment of the invention, comprising a sleeping facility in front of and behind the work area.
Figure 22:
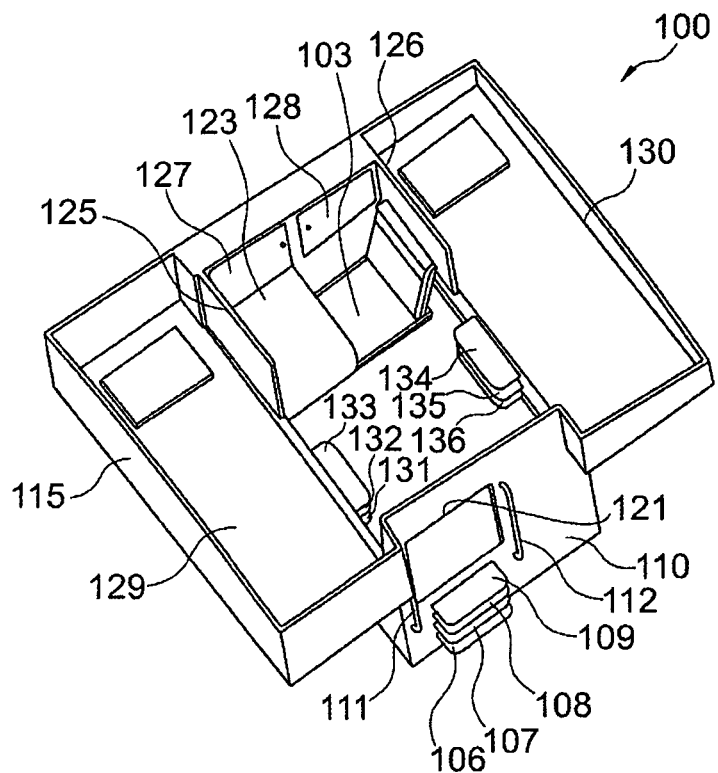
FIG. 22 shows a diagrammatic three-dimensional view of the habitation and sleeping module according to an exemplary embodiment of the invention, comprising a sleeping facility in front of and behind the work area.

FIGS. 20 to 22 show a diagrammatic three-dimensional top view of a module according to an exemplary embodiment of the invention.

Figure 23:
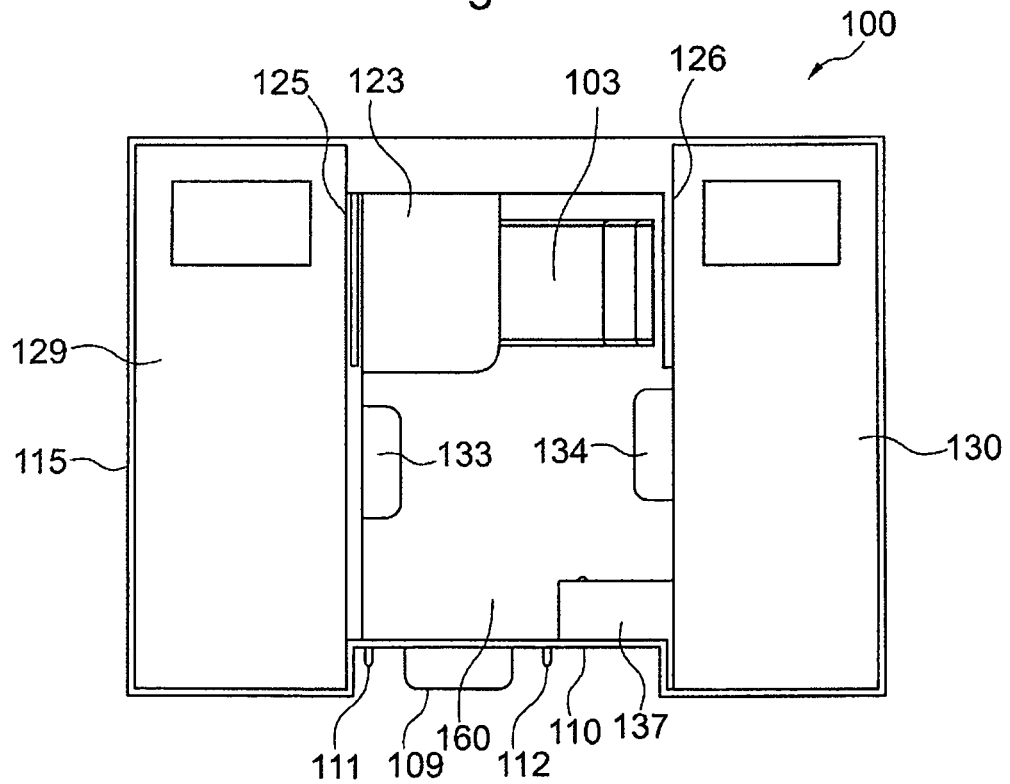
FIG. 23 shows a diagrammatic two-dimensional horizontal section view according to an exemplary embodiment of the present invention, comprising a sleeping facility in front of and behind the work area, with a top view of the module.

FIG. 23 shows a diagrammatic two-dimensional horizontal section view and thus a top view into a module. This illustrates the spatial separation of the two beds 129 and 130, which separation provides a high level of privacy for the crew members. Also shown is the wall cupboard 137 in the work area 160, which ensures the provision of additional storage space. This top view further shows that the ascent region 110 is designed so as to be vertical, so that the least-possible loss of space for the ascent region results.

Figure 24:
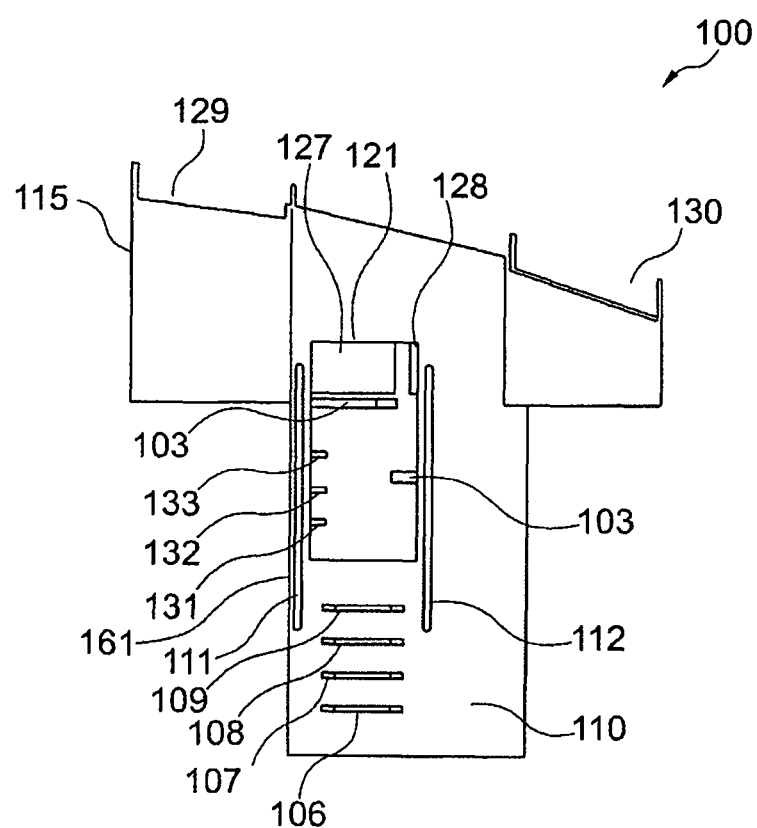
FIG. 24 shows a diagrammatic two-dimensional vertical view according to an exemplary embodiment of the present invention, comprising a sleeping facility in front of and behind the work area, with a view of the lateral ascent region.

FIG. 24 shows a diagrammatic two-dimensional lateral view of a module 100 according to an exemplary embodiment of the present invention.

FIG. 25 shows a diagrammatic two-dimensional vertical section view of the aircraft fuselage in longitudinal direction of the aircraft, wherein the diagram in an exemplary manner shows the exemplary embodiment of the module according to FIG. 1. The module 100, which closes off the passenger region 152, has a direct connection to the cockpit 190. In this way a direct connection for the cockpit crew from the cockpit to the flight crew rest compartment, i.e. the module 100, can be made. The diagram clearly shows that in the passenger region 152 the module has no influence on the design or appearance of the cabin. In contrast to existing solutions this does not result in any design limitations relating to this cabin region.

Figure 26:
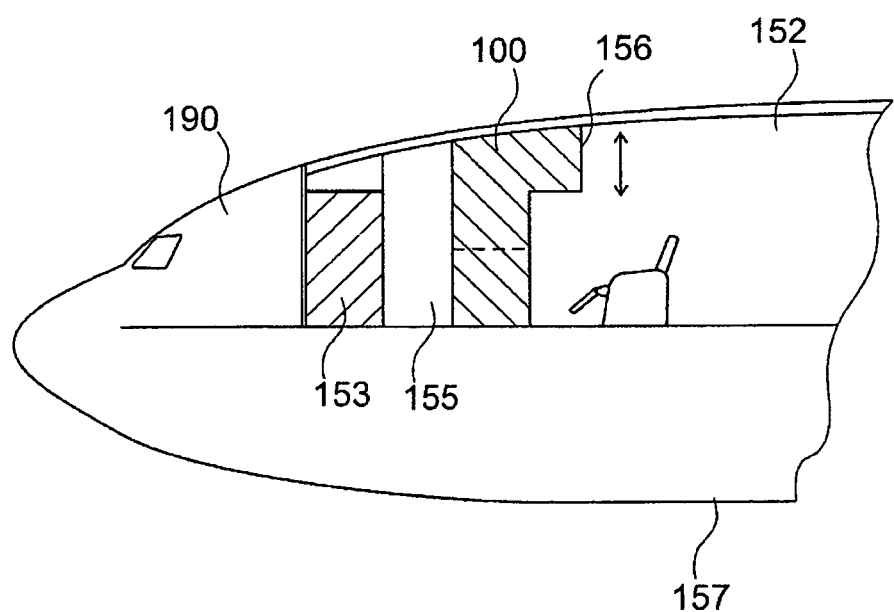
FIG. 26 shows a diagrammatic two-dimensional vertical section view of the aircraft fuselage according to an exemplary embodiment of the present invention.

FIG. 26 shows a diagrammatic two-dimensional vertical section view, along the longitudinal axis of the aircraft, of the exemplary embodiment according to FIG. 8, of the module according to the invention. The module 100 has been arranged such that in the cross-aisle region 155, i.e. in the passage between the module and a possible galley 153, no consideration relating to the height of the passage in this region is required. However, if it is necessary to design this exemplary embodiment of the present invention such that the module projects into the passage by some millimetres or centimetres, at least across most of the passage width the height of the passage does not have to be taken into account. Furthermore, the diagram shows that as a result of the rising shape of the aircraft fuselage 157 the rear delimitation wall of the module 156 is significantly higher than has been usual up to now. This may ensure more headroom, between the pillow and the ceiling, for a crew member.

Figure 27:
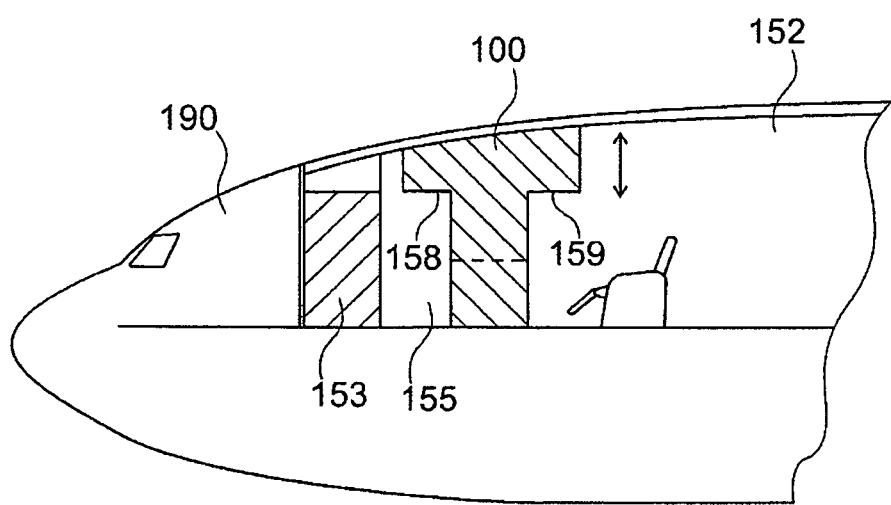
FIG. 27 shows a diagrammatic two-dimensional vertical section view of the aircraft fuselage according to an exemplary embodiment of the present invention.

FIG. 27 shows a diagrammatic two-dimensional vertical section view along the longitudinal direction of the aircraft fuselage, wherein the diagram shows the module 100 according to the exemplary embodiment shown in FIG. 16. By spatially separating the two sleeping areas 158 and 159 a very high level of privacy is provided for the members of the crew.

Figure 28:
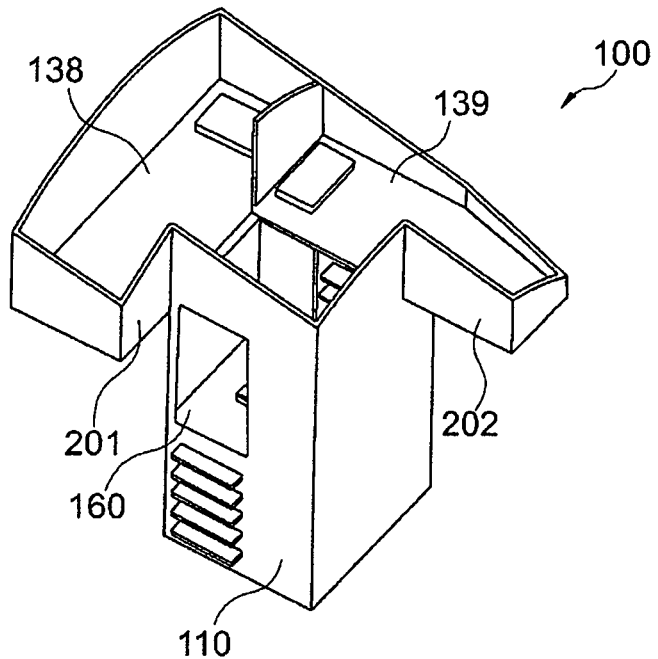
FIG. 28 shows a diagrammatic three-dimensional view of the habitation and sleeping module according to an exemplary embodiment of the invention, comprising a rear and a lateral sleeping facility.
Figure 29:
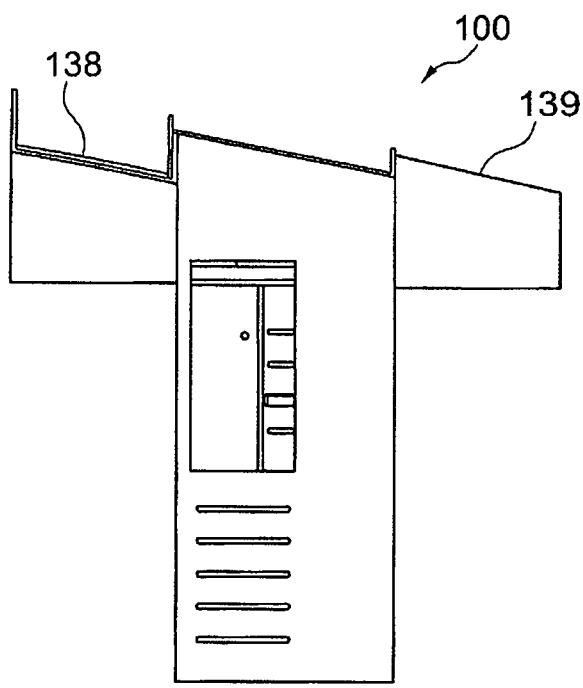
FIG. 29 shows a diagrammatic two-dimensional lateral view according to an exemplary embodiment of the present invention, with a view of the lateral ascent region.
Figure 30:
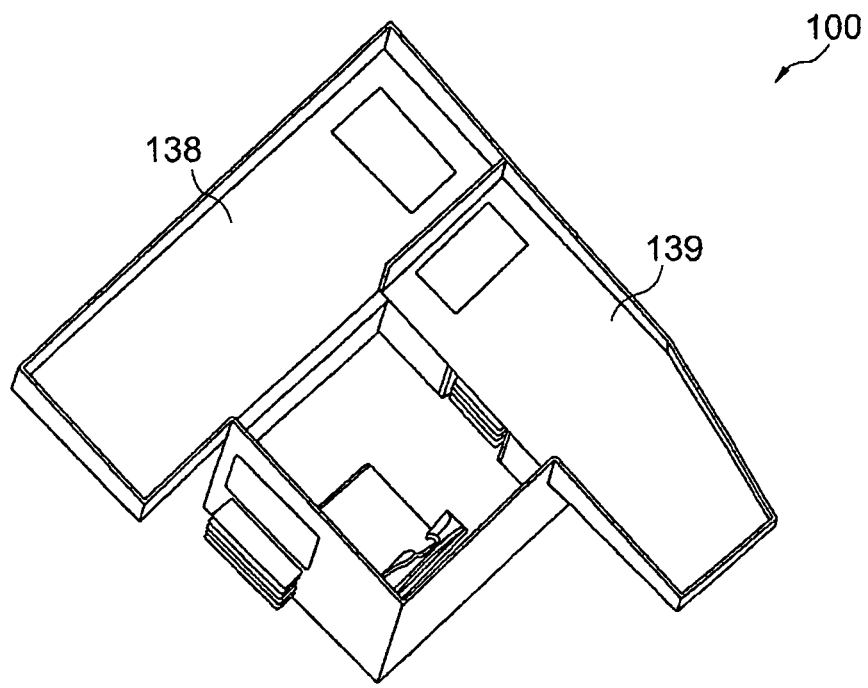
FIG. 30 shows a diagrammatic three-dimensional view of the habitation and sleeping module according to an exemplary embodiment of the present invention, comprising a rear and a lateral sleeping facility, with a top view of the module.
Figure 31:
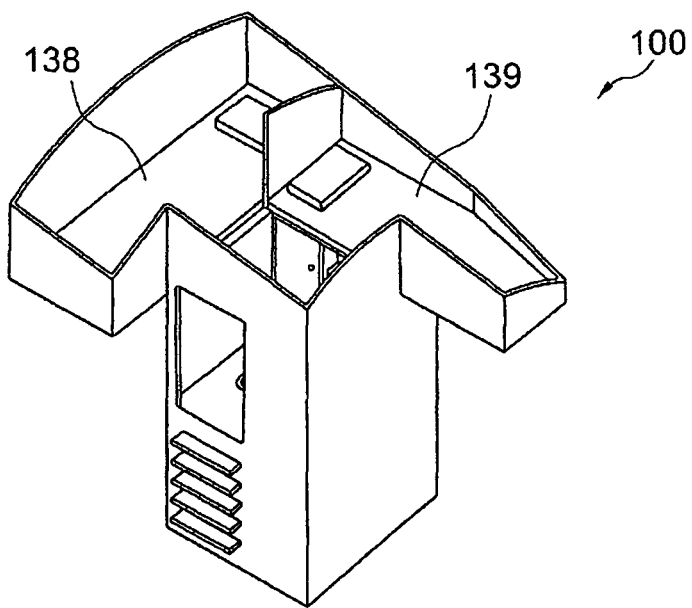
FIG. 31 shows a diagrammatic three-dimensional view of the habitation and sleeping module according to an exemplary embodiment of the invention, comprising a rear and a lateral sleeping facility.
Figure 32:
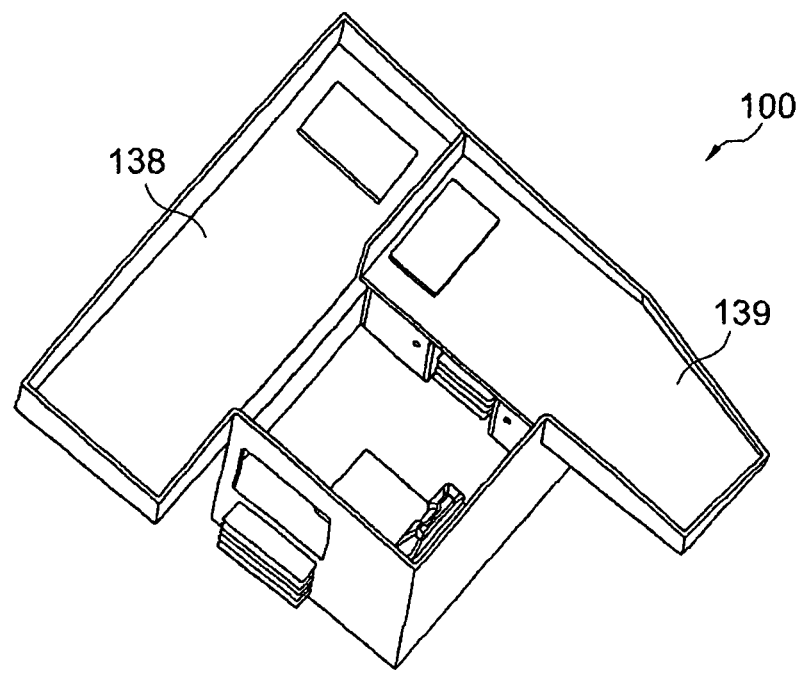
FIG. 32 shows a diagrammatic three-dimensional view of the habitation and sleeping module according to an exemplary embodiment of the invention, comprising a rear and a lateral sleeping facility, with a top view of the module.
Figure 33:
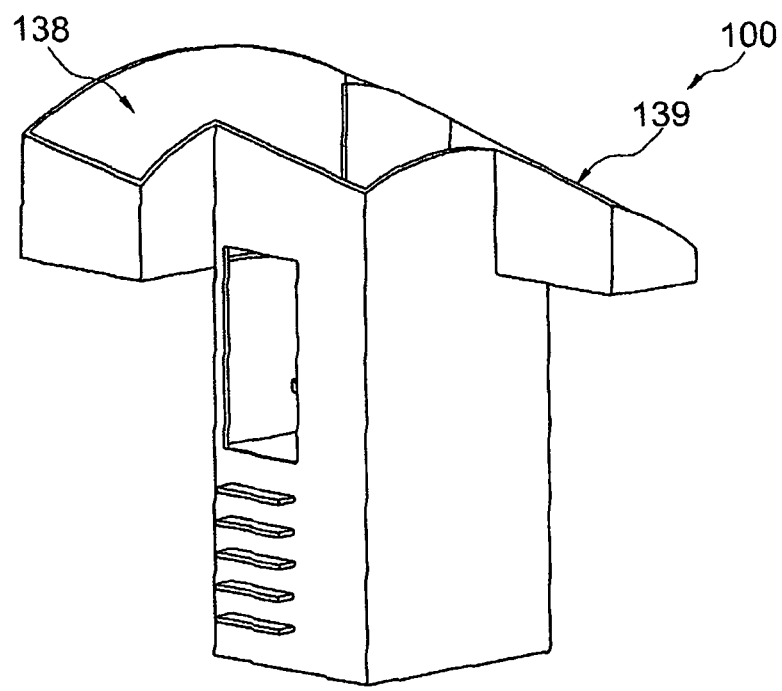
FIG. 33 shows a diagrammatic three-dimensional view of the habitation and sleeping module according to an exemplary embodiment of the invention, comprising a rear and a lateral sleeping facility.
Figure 34:
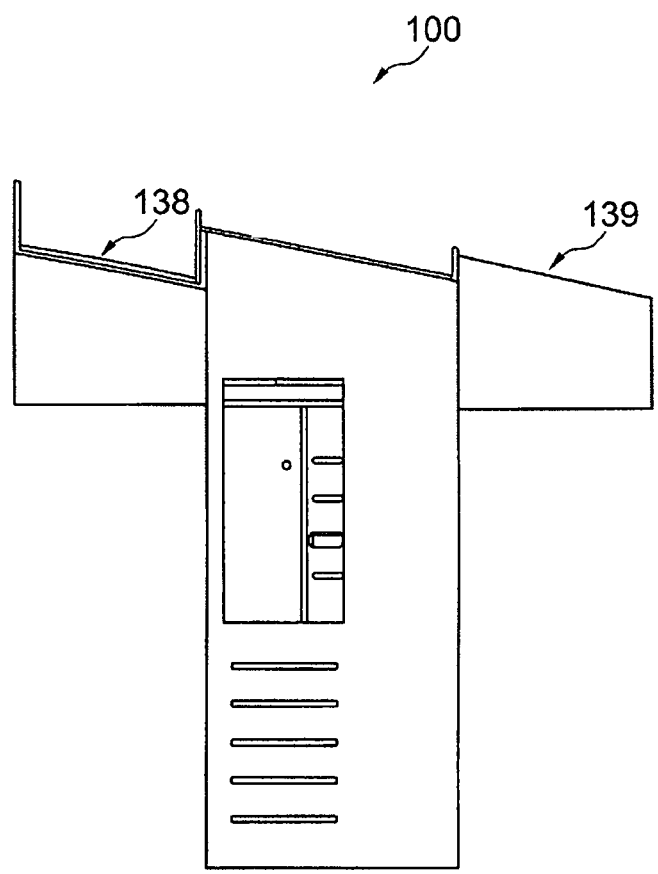
FIG. 34 shows a diagrammatic two-dimensional lateral view according to an exemplary embodiment of the present invention, with a view of the lateral ascent region.

FIG. 28 shows a diagrammatic three-dimensional view of the habitation and sleeping module according to the invention, according to an exemplary embodiment of the present invention, comprising a rear 138 and a lateral 139 sleeping facility. In this arrangement both sleeping facilities can be designed as folding beds. In this arrangement of the two sleeping areas on the work area 160 the wall region 201 of the rear sleeping facility 138 projects beyond the ascent region 110 to a lesser extent than is the case, for example, in the embodiment shown in FIG. 8. However, in this embodiment it has to be accepted that the lateral sleeping facility with the wall area 202 projects further beyond the face 180 of the module than is the case, for example, in the embodiment shown in FIG. 8. Depending on the requirements relating to area and space, a corresponding variant can be selected.

FIGS. 29-34 show different views of the habitation and sleeping module according to the invention, according to an exemplary embodiment of the present invention, comprising a rear 138 and a lateral 139 sleeping facility. In this arrangement both sleeping facilities are imaginable and possible in the design of a folding bed.

Figure 35:
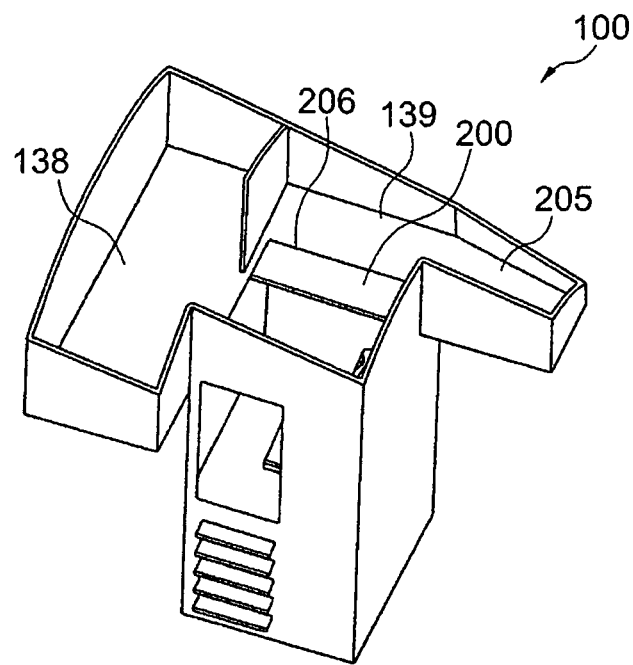
FIG. 35 shows a diagrammatic three-dimensional view of the habitation and sleeping module according to an exemplary embodiment of the invention, comprising a rear and a lateral fold-out sleeping facility.

FIG. 35 shows a diagrammatic three-dimensional view of the habitation and sleeping module according to the invention, according to an exemplary embodiment of the present invention, comprising a rear 138 and a lateral 139 sleeping facility. In this arrangement the lateral sleeping facility 139 is explicitly shown in the form of a folding bed. The sleeping facility is shown without any textile material on top in order to make it possible to see the floor 205 of the sleeping facility. The diagram clearly shows the foldable part 200 of the bed. By means of a connecting piece 206, this foldable part is affixed to the fixed part of the bed such that it can both be folded over and lowered, and can, for example, in some other position in the module be re-affixed as a sideboard. In this arrangement the connecting piece is designed such that it makes these two functions possible. In the position of the fold-out part as shown in the diagram, the bed is provided in its entirety. Further positions and functions of the folding bed are shown in FIGS. 36 and 37.

Figure 36:
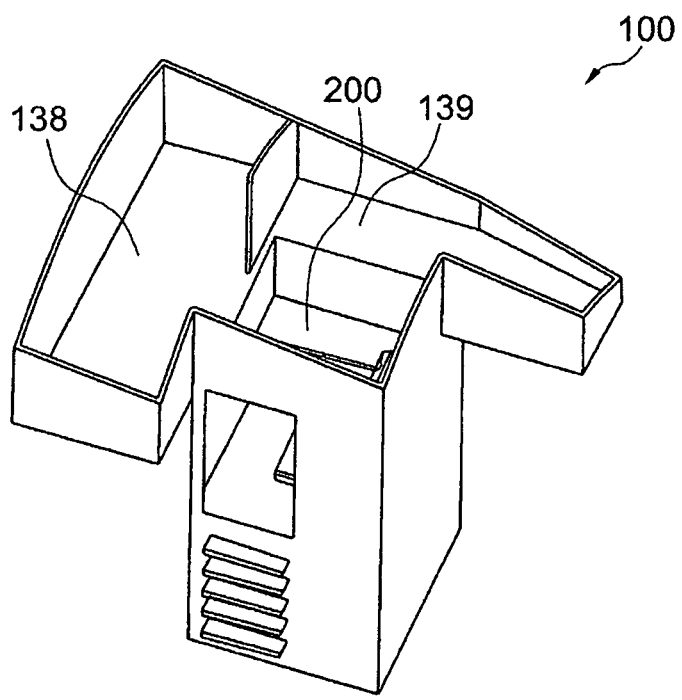
FIG. 36 shows a diagrammatic three-dimensional view of the habitation and sleeping module according to an exemplary embodiment of the invention, comprising a rear and a lateral fold-out sleeping facility.

FIG. 36 shows a diagrammatic three-dimensional view of the habitation and sleeping module according to the invention, according to an exemplary embodiment of the present invention, comprising a rear 138 and a lateral 139 sleeping facility. In this arrangement the rear sleeping facility is a folding bed. In this diagram the fold-out part of the bed is shown in its lowered position; it can be used as an additional sideboard or table if the second sleeping facility is not required, for example in the case of short flights.

Figure 37:
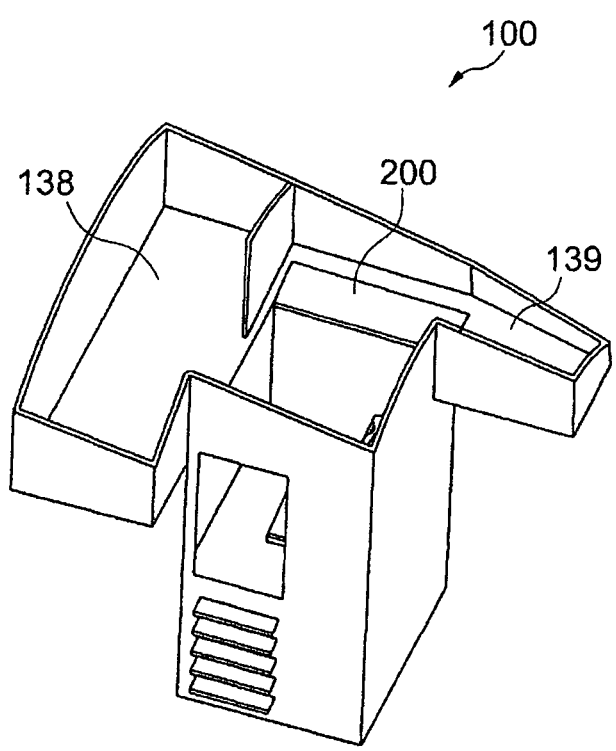
FIG. 37 shows a diagrammatic three-dimensional view of the habitation and sleeping module according to an exemplary embodiment of the invention, comprising a rear and a lateral fold-out sleeping facility.

FIG. 37 shows a diagrammatic three-dimensional view of the habitation and sleeping module according to an exemplary embodiment of the present invention, comprising a rear 138 and a lateral 139 sleeping facility. In this arrangement the fold-out part of the lateral bed is completely hinged onto its fixed part. In this way, for example, the useable area within the module is increased, which may provide an improved level of comfort for the crew members in the module.

In addition, it should be pointed out that "comprising" does not exclude other elements or steps, and "a" or "one" does not exclude a plural number. Furthermore, it should be pointed out that characteristics or steps which have been described with reference to one of the above exemplary embodiments can also be used in combination with other characteristics or steps of other exemplary embodiments described above. Reference characters in the claims are not to be interpreted as limitations.

The invention claimed is:

1. An aircraft with a passenger cabin and a module for accommodating at least one member of a flight crew, the module being arranged on a floor of the passenger cabin, the module comprising:
a first sleeping area;
a work area comprising a work area floor arranged above the floor of the passenger cabin and configured for accommodating at least one member of the flight crew;
a left outside wall parallel to a longitudinal direction of the aircraft and a right outside wall parallel to the longitudinal direction of the aircraft, between which the work area floor is arranged; and
an ascent region for ascending from the floor of the passenger cabin up and into the work area of the module;
wherein the ascent region comprises an ascent device laterally vertically arranged on the left or the right outside wall of the module and comprising steps arranged at the left or the right outside wall one above the other such that the ascent device leads a user in a vertical direction while the user faces a transverse direction of the aircraft; and
wherein the module is configured such that a volume underneath the work area floor and between the left and the right outside walls is available in a full width, a full depth and a full height thereof as an area for a placement of items and is configured to be accessed from a front or a rear side of the module.

2. The aircraft of claim 1, wherein the work area comprises at least one seating facility;
wherein the seating facility is a seating facility selected from the group consisting of a folding seat, aircraft seat, passenger seat, business class seat and a high-comfort cabin attendant seat.

3. The aircraft of claim 1, wherein the work area comprises at least one table;
wherein the table is a table selected from the group consisting of a folding table, solid table, backrest fold-out table and a swivellable table.

4. The aircraft of claim 1, wherein the work area comprises at least one entrance region.

5. The aircraft of claim 1, wherein the first sleeping area comprises at least one sleeping facility.

6. The aircraft of claim 1, wherein the module further comprises:
an area that adjoins the first sleeping area; and
a partition wall;
wherein the first sleeping area is at least in part separated from the adjoining area by the partition wall.

7. The aircraft of claim 1, wherein the module is configured such that the module connects directly to the cockpit.

8. The aircraft of claim 1, wherein the first sleeping area extends from the work area to a front region of the module in a longitudinal direction of the module and comprises first and second two sleeping facilities in the longitudinal direction of the aircraft.

9. The aircraft of claim 1,
wherein the first sleeping area extends from the work area to the rear of the module and further comprises a rear sleeping facility and a lateral sleeping facility;
wherein the rear sleeping facility extends so as to be substantially perpendicular to the longitudinal direction of the aircraft; and
wherein the lateral sleeping facility extends so as to be substantially parallel to the longitudinal direction of the aircraft.

10. The aircraft of claim 1, wherein the module further comprises:
a first sleeping facility; and
a second sleeping area with a second sleeping facility;
wherein the first sleeping area extends from the work area to a front region of the module;
wherein the second sleeping area extends from the work area to a rear region of the module;
wherein the first and second sleeping facilities are aligned so as to be perpendicular in relation to the longitudinal direction of the aircraft.

11. The aircraft of claim 1, wherein the module comprises an opening in the ascent region, through which opening it is possible to enter the module from a lower level.

12. The aircraft of claim 2, wherein the seating facility is configured as a TTL-certifiable seating facility.

\* \* \* \* \*